US012380320B2

(12) United States Patent
Zjajo et al.

(10) Patent No.: US 12,380,320 B2
(45) Date of Patent: Aug. 5, 2025

(54) RESILIENT NEURAL NETWORK

(71) Applicant: Innatera Nanosystems B.V., Rijswijk (NL)

(72) Inventors: Amir Zjajo, The Hague (NL); Sumeet Susheel Kumar, The Hague (NL)

(73) Assignee: INNATERA NANOSYSTEMS B.V., Rijswijk (NL)

(*) Notice: Subject to any disclaimer, the term of this patent is extended or adjusted under 35 U.S.C. 154(b) by 1032 days.

(21) Appl. No.: 17/294,697

(22) PCT Filed: Nov. 18, 2019

(86) PCT No.: PCT/EP2019/081662
§ 371 (c)(1),
(2) Date: May 18, 2021

(87) PCT Pub. No.: WO2020/099680
PCT Pub. Date: May 22, 2020

(65) Prior Publication Data
US 2022/0012564 A1    Jan. 13, 2022

Related U.S. Application Data

(60) Provisional application No. 62/768,927, filed on Nov. 18, 2018.

(51) Int. Cl.
*G06N 3/049* (2023.01)
*G06N 3/045* (2023.01)
(Continued)

(52) U.S. Cl.
CPC ............. *G06N 3/049* (2013.01); *G06N 3/045* (2023.01); *G06N 3/063* (2013.01); *G06N 3/08* (2013.01)

(58) Field of Classification Search
CPC ........ G06N 3/049; G06N 3/045; G06N 3/063; G06N 3/08; G06N 3/088
See application file for complete search history.

(56) References Cited

U.S. PATENT DOCUMENTS 5,255,347 A    10/1993  Matsuba et al.
9,189,730 B1*  11/2015  Coenen .................. G06N 3/049
(Continued)

FOREIGN PATENT DOCUMENTS

CN    104641385 A    5/2015
CN    105122278 A    12/2015
(Continued)

OTHER PUBLICATIONS

Galtier, Mathieu, et al. "A biological gradient descent for prediction through a combination of STDP and homeostatic plasticity." arXiv preprint arXiv:1206.4812 (2012), pp. 1-36 (Year: 2012).*
(Continued)

*Primary Examiner* — Omar F Fernandez Rivas
*Assistant Examiner* — Michael C. Lee
(74) *Attorney, Agent, or Firm* — David P. Owen; Hoyng Rokh Monegier B.V.

(57) ABSTRACT

The present invention discloses a spiking neural network for classifying input signals. The spiking neural network comprises a plurality of spiking neurons, and a plurality of synaptic elements interconnecting the spiking neurons to form the network. Each synaptic element is adapted to receive a synaptic input signal and apply a weight to the synaptic input signal to generate a synaptic output signal, the synaptic elements being configurable to adjust the weight applied by each synaptic element. Furthermore, each of the spiking neurons is adapted to receive one or more of the synaptic output signals from one or more of the synaptic elements, and generate a spatio-temporal spike train output (Continued)

signal in response to the received one or more synaptic output signals. The spiking neural network is partitioned into multiple sub-networks, wherein each sub-network comprises a sub-set of the spiking neurons connected to receive synaptic output signals from a sub-set of the synaptic elements. The sub-network is adapted to generate a sub-network output pattern signal in response to a sub-network input pattern signal applied to the sub-network. Furthermore, each sub-network forms part of one or multiple cores in an array of cores, each core consisting of a programmable network of spiking neurons implemented in hardware or a combination of hardware and software. Communication between cores in the core array is arranged through a programmable interconnect structure.

16 Claims, 10 Drawing Sheets

(51) Int. Cl.
 *G06N 3/063* (2023.01)
 *G06N 3/08* (2023.01)

(56) References Cited

U.S. PATENT DOCUMENTS

| | | | |
|---|---|---|---|
| 9,558,443 B2* | 1/2017 | Alvarez-Icaza | G06N 3/047 |
| 11,423,312 B2* | 8/2022 | Choi | G06N 3/082 |
| 2013/0073491 A1 | 3/2013 | Izhikevich et al. | |
| 2013/0073499 A1 | 3/2013 | Izhikevich et al. | |
| 2014/0064609 A1 | 3/2014 | Petre | |
| 2015/0106316 A1* | 4/2015 | Birdwell | G06N 3/086 706/33 |
| 2015/0242745 A1 | 8/2015 | Wang et al. | |
| 2015/0346302 A1* | 12/2015 | Hart | A61B 5/055 702/19 |
| 2017/0116513 A1* | 4/2017 | Andreopoulos | G06N 3/063 |
| 2017/0154259 A1 | 6/2017 | Burr et al. | |
| 2017/0236027 A1 | 8/2017 | van der Made et al. | |
| 2017/0316310 A1 | 11/2017 | Cho et al. | |
| 2018/0082182 A1 | 3/2018 | Amir et al. | |
| 2018/0322384 A1* | 11/2018 | Augustine | G06N 3/049 |
| 2020/0272883 A1* | 8/2020 | Cao | G06N 3/006 |

FOREIGN PATENT DOCUMENTS

| | | |
|---|---|---|
| CN | 106022469 A | 10/2016 |
| CN | 107092959 A | 8/2017 |
| CN | 107408222 A | 11/2017 |
| JP | H047660 A | 1/1992 |
| JP | 2017509978 A | 4/2017 |
| WO | 2015127110 A2 | 8/2015 |

OTHER PUBLICATIONS

Hui, Qing, et al. "A stochastic mean field model for an excitatory and inhibitory synaptic drive cortical neuronal network." IEEE transactions on neural networks and learning systems 25.4 (2013): pp. 751-763 (Year: 2013).*

Alawad, Mohammed, et al. "Energy efficient stochastic-based deep spiking neural networks for sparse datasets." 2017 IEEE International Conference on Big Data (Big Data). IEEE, 2017, p. 311-318. (Year: 2017).*

Kim, Christopher, et al. "Learning recurrent dynamics in spiking networks." arXiv preprint arXiv:1803.06622 (Aug. 18, 2018), pp. 1-13 (Year: 2018).*

Lee, Chankyu, et al. "Deep spiking convolutional neural network trained with unsupervised spike-timing-dependent plasticity." IEEE Transactions on Cognitive and Developmental Systems 11.3 (May 4, 2018), pp. 384-394 (Year: 2018).*

Rui, Wang et al. "Research Progress on Photonic Neuromorphic Computing." 2016. (Year: 2016).*

Joshi Siddharth et al: "Neuromorphic Event-Driven Multi-Scale Synaptic Connectivity and Plasticity", 2017 51st Asilomar Conference on Signals, Systems, and computers, IEEE, Oct. 29, 2017.

International Search Report for PCT/EP2019/081662 issued on Jun. 24, 2020.

International Preliminary Report on Patentability for PCT/EP2019/081662 issued on May 27, 2021.

L. Deng, et al. "Recent advances in deep learning for speech research at Microsoft," IEEE International Conference on Acoustics, Speech and Signal Processing, pp. 1-5, 2013.

A. Krizhevsky, I. Sutskever, G.E. Hinton, "ImageNet classification with deep convolutional neural networks," Advances in Neural Information Processing Systems, vol. 25, No. 2, pp. 1-9, 2012.

Y.-H. Chen, T. Krishna, J. Erner, V. Sze, "An energy-efficient reconfigurable accelerator for deep convolution al neural networks," IEEE International Solid-State Circuit Conference, pp. 262-263, 2016.

S.W. Park, J. Park, K. bong, D. Shin, J. Lee, S. Choi, H.J. Yoo, "An energy-efficient and scalable deep learning/inference processor with tetra-parallel MIMD architecture for big data applications," IEEE Transactions on Biomedical Circuits and Systems, vol. 9, pp. 838-848, 2016.

J. Hasler, B . Marr, "Finding a roadmap to achieve large neuromorphic hardware systems," Frontiers in Neuroscience, vol. 7, pp. 1-29, 2013.

P. O'Connor, D. Neil, S.-C. Liu, T. Delbruck, M. Pfeiffer, "Real-time classification and sensor fusion with a spiking deep belief network," Frontiers in Neuromorphic Engineering, vol. 7, pp. 1-13, 2013.

P. U. Diehl, et al., "Fast-classifying, high-accuracy spiking deep networks through weight and threshold balancing," IEEE International Joint Conference on Neural Networks, pp. 2933-2940, 2015.

M.J.M. Pelgrom, A.C.J. Duinmaijer, A.P.G. Welbers, "Matching properties of MOS transistors," IEEE Journal of Solid-State Circuits, vol. 24, No. 5, pp. 1433-1439, 1989.

K.L. Shepard, V. Narayanan, "Noise in deep submicron digital design," IEEE International Conference on Computer-Aided Design, pp. 524-531, 1997.

D. Cohen, M. Nicolelis, "Reduction of single-neuron firing uncertainty by cortical ensembles during motor skill learning," Journal of Neuroscience, vol. 24, No. 14, pp. 3574-3582, 2004.

M. Laubach, J. Wessber, M.A. Nicolelis, "Cortical ensemble activity increasingly predicts behaviour outcomes during learning of a motor task," Nature, vol. 405, pp. 567-571, 2000.

B.V. Dasarathy, B.V. Sheela, "Composite classifier system design: concepts and methodology," Proceedings of the IEEE, vol. 67, No. 5, pp. 708-713, 1979.

L.K. Hansen, P. Salamon, "Neural network ensembles," IEEE Transactions on Pattern Analysis and Machine Intelligence, vol. 12, No. 10, pp. 993-1001, 1990.

R.E. Schapire, "The strength of weak learnability," Machine Learning, vol. 5, No. 2, pp. 197-227, Jun. 1990.

L. Breiman, "Bagging predictors," Machine Learning, vol. 24, No. 2, pp. 123-140, 1996.

R.A. Jacobs, M.I. Jordan, S.J. Nowlan, G.E. Hinton, "Adaptive mixtures of local experts," Neural Computation, vol. 3, No. 1, pp. 79-87, 1991.

M.J. Jordan, R.A. Jacobs, "Hierarchical mixtures of experts and the EMalgorithm," Neural Computation, vol. 6, No. 2, pp. 181-214, 1994.

D.H. Wolpert, "Stacked generalization," Neural Networks, vol. 5, No. 2, pp. 241-259, 1992.

J.A. Benediktsson, P.H. Swain, "Consensus theoretic classification methods," IEEE Transactions on Systems, Man and Cybernetics, vol. 22, No. 4, pp. 688-704, 1992.

L. Xu, A. Krzyzak, C.Y. Suen, "Methods of combining multiple classifiers and their applications to handwriting recognition," IEEE Transactions on Systems, Man and Cybernetics, vol. 22, No. 3, pp. 418-435, 1992.

(56) References Cited

OTHER PUBLICATIONS

T.K. Ho, J.J. Hull, S.N. Srihari, "Decision combination in multiple classifier systems," IEEE Transactions on Pattern Analysis and Machine Intelligence, vol. 16, No. 1, pp. 66-75, 1994.
G. Rogova, "Combining the results of several neural network classifiers," Neural Networks, vol. 7, No. 5, pp. 777-781, 1994.
L. Lam, C.Y. Suen, "Optimal combinations of pattern classifiers," Pattern Recognition Letters, vol. 16, No. 9, pp. 945-954, 1995.
K. Woods, W.P.J. Kegelmeyer, K. Bowyer, "Combination of multiple classifiers using local accuracy estimates," IEEE Transactions on Pattern Analysis and Machine Intelligence, vol. 19, No. 4, pp. 405-410, 1997.
I. Bloch, "Information combination operators for data fusion: A comparative review with classification," IEEE Transactions on Systems, Man, and Cybernetics Part A:Systems and Humans, vol. 26, No. 1, pp. 52-67, 1996.
S.B. Cho, J.H. Kim, "Combining multiple neural networks by fuzzy integral for robust classification," IEEE Transactions on Systems, Man and Cybernetics, vol. 25, No. 2, pp. 380-384, 1995.
L.I. Kuncheva, J.C. Bezdek, R.P.W. Duin, "Decision templates for multiple classifier fusion: an experimental comparison," Pattern Recognition, vol. 34, No. 2, pp. 299-314, 2001.
H. Drucker, et al. "Boosting and other ensemble methods," Neural Computation, vol. 6, No. 6, pp. 1289-1301, 1994.
L. I. Kuncheva, "Classifier ensembles for changing environments," 5th International Workshop on Multiple Classifier Systems in Lecture Notes in Computer Science, eds. F. Roli, J. Kittler, and T. Windeatt, vol. 3077, pp. 1-15, Cagliari, Italy, 2004.
R. Avnimelech, N. Intrator, "Boosted mixture of experts: an ensemble learning scheme," Neural Computation, vol. 11, pp. 483-497, 1999.
A.P. Dempster, N.M. Laird, D.B. Rubin, "Maximum likelihood from incomplete data via the EM algorithm," Journal of the Royal Statistical Society, series B, vol. 39, No. 1, pp. 1-38, 1977.
Y. Shim, A. Philippides, K. Staras, P. Husbands, "Unsupervised learning in an ensemble of spiking neural networks mediated by ITDP," PLOS Computational Biology, vol. 12, pp. 1-41, 2016.
B. Nessler, M. Pfeiffer, L. Buesing, W. Maass, "Bayesian computation emerges in generic cortical microcircuits through spike-timing-dependent plasticity," PLOS Computational Biology, vol. 9, No. 4, pp. 1-30, 2013.
E. Chicca, S. Fusi, "Stochastic synaptic plasticity in deterministic a VLSI networks of spiking neurons," Proceedings of the World Congress on Neuroinformatics, pp. 1-11, 2013.
C. Zhang, G. Wang, J. Zhao, P. Gao, J. Lin, H. Yang, "Patient-specific ECG classification based on recurrent neural networks and clustering technique", IEEE Int. Cont. Biomed. Eng., pp. 63-67, 2017.
C. Ribrault, K. Sekimoto, A. Triller, "From the stochasticity of molecular processes to the variability of synaptic transmission," Nature Rev. Neurosc., vol. 12, pp. 375-387, 2011.
E.S. Kuebler, et al., "Stimulus discrimination in networks of spiking neurons," IEEE Int. Joint Cont. Neur. Netw., pp. 1-8, 2013.
M. Kawaguchi, H. Mino, D.M. Durand, "Stochastic resonance can enhance information transmission in neural networks," IEEE Trans. Neur. Netw., vol. 58, No. 7, pp. 1950-1958, 2011.
H. Chen, et al., "Noise-enhanced information systems," Proc. IEEE, vol. 102, No. 10, pp. 1607-1621, 2014.
A.K. Alijani, M.J. Richardson, "Rate response of neurons subject to fast or frozen noise: from stochastic and homogeneous to deterministic and heterogeneous populations," Physical Review E, vol. 84, No. 1, pp. 1-9, 2011.
L. Hertag, D. Durstewitz, N. Brunel, "Analytical approximations of the firing rate of an adaptive exponential integrate-fire neuron in the presence of synaptic noise," Frontiers in Computational Neuroscience, vol. 8, pp. 1-22, 2014.
R.H. Bartels, G.W. Stewart, "Solution of the Matrix Equation AX+XB=C," Comm. Assoc. Comp. Mach., vol. 15, pp. 820-826, 1972.
L. Arnold, Stochastic Differential Equations: Theory and Application, New York: Wiley, 1974.
A. Zjajo, et al., "Stochastic analysis of deep-submicrometer CMOS process for reliable circuits designs," IEEE Transactions on Circuits and Systems-/, vol. 58, No. 1, pp. 164-175, 2011.
Y. Hong, J. Wang, D. Cheng, "Adaptive finite-time control of nonlinear systems with parametric uncertainty," IEEE Transactions on Automatic Control, vol. 51, No. 5, pp. 858-862, 2006.
J. Lu, D. Ho, Z. Wang, "Pinning stabilization of linearly coupled stochastic neural networks via minimum number of controllers," IEEE Transactions on Neural Networks, vol. 20, No. 10, pp. 1617-1629, 2009.
J. Cortes, "Finite-time convergent gradient flows with applications to network consensus," Automatica, vol. 42, No. 11, pp. 1993-2000, 2006.
E. Benetos et al., "Automatic Music Transcription: Challenges and future directions," Journal of Intelligent Information Systems, vol. 41, No. 3, pp. 407-434, Dec. 2013.
M.A. Bahari, "Automatic Speaker Characterization—Automatic Identification of Gender, Age, Language and Accent from Speech Signals (PhD Dissertation)," KU Leuven—Faculty of Engineering Science, Heverlee, 2013.
E.J. Luz et al., "ECG-based heartbeat classification for arrhythmia detection: A survey," Computer Methods and Programs in Biomedicine, vol. 127, pp. 144-164, 2016.
S. Alavi et al., "Quaternion-Based Gesture Recognition Using Wireless Wearable Motion Capture Sensors," Sensors, vol. 16, No. 5, 2016.
A.Y. Benbasat, J.A. Paradiso, "An Inertial Measurement Framework for Gesture Recognition and Applications," in Revised Papers from the International Gesture Workshop on Gesture and Sign Languages in Human-Computer Interaction, 2002.
S. Jiang et al., "Development of a real-time hand gesture recognition wristband based on sEMG and IMU sensing," in International Conference on Robotics and Biomimetics (ROBIO),, 2016.
J. Zhu et al., "Automatic Recognition of Radar Signal Based on Time-Frequency Image Shape Character," Defense Science Journal, vol. 63, No. 3, pp. 308-314, May 2013.
W. Maass, "Networks of spiking neurons: The third generation of neural network models,," Neural Networks, vol. 10, No. 9, pp. 1659-1671, 1997.
K.S. Burbank, "Mirrored STDP Implements Autoencoder Learning in a Network of Spiking Neurons," PLOS Computational Biology, vol. 11, No. 12, pp. 1-24, 2015.
Y. Bengio et al., "Greedy Layer-wise Training of Deep Networks," in Proceedings of the 19th International Conference on Neural Information Processing Systems, 2006.
P. Vincent et al., "Extracting and Composing Robust Features with Denoising Autoencoders," in Proceedings of the 25th International Conference on Machine Learning, 2008.
O.E. David, I. Greental, "Genetic Algorithms for Evolving Deep Neural Networks," in Proceedings of the Companion Publication of the 2014 Annual Conference on Genetic and Evolutionary Computation, 2014.
O. Booij, H.T. Nguyen, "A gradient descent rule for spiking neurons emitting multiple spikes," Information Processing Letters, vol. 95, No. 6, pp. 552-558, 2005.
J.H. Lee, T. Delbruck, M. Pfeiffer, "Training Deep Spiking Neural Networks Using Backpropagation," Frontiers in Neuroscience, vol. 10, p. 508, 2016.
Y. Chen, "Mechanisms of Winner-Take-All and Group Selection in Neuronal Spiking Networks," Frontiers in computational neuroscience, vol. 11, No. 20, 2017.
M. Oster, S.C. Liu, "A winner-take-all spiking network with spiking inputs," in Proceedings of the 2004 11th IEEE International Conference on Electronics, Circuits and Systems, 2004.
M. Oster, R. Douglas, S.C. Liu, "Computation with Spikes in a Winner-take-all Network," Neural Computing, vol. 21, No. 9, pp. 2437-2465, 2009.
E. Satuvuori, T. Kreuz, "Which spike train distance is most suitable for distinguishing rate and temporal coding?", Journal of Neuroscience Methods, vol. 299, pp. 22-33, 2018.
J.H. Lee, et al. "Training Deep Spiking Neural Networks Using Backpropagation", Frontiers in neuroscience, vol. 10, No. 508. Nov. 2016.

(56) References Cited

OTHER PUBLICATIONS

D.E. Feldman, "The spike-timing dependence of plasticity." Neuron, vol. 75 No. 4 2012.
M. Kawaguchi et al, Analog Neural Circuit with Switched Capacitor and Design of Deep Learning Model, 2015 3rd International Conference on Applied Computing and Information Technology/2nd International Conference on Computational Science and Intelligence, Okayama, Japan, 2015, Nov. 30, 2015.
Shrestha Amar et al: "Stable spike-timing dependent plasticity rule for multilayer unsupervised and supervised learning",2017 International Joint Conference on Neural Networks (IJCNN), IEEE, May 14, 2017 (May 14, 2017), pp. 1999-2006, XP033112292, DOI: 10.1109/ IJCNN.2017.7966096 [retrieved on Jun. 30, 2017].
Zjajo Amir et al: "Uncertainty in Noise-Driven Steady-State Neuromorphic Network for ECG Data Classification", 2018 IEEE 31st International Symposium on Computerbased Medical Systems (CBMS), IEEE, Jun. 18, 2018 (Jun. 18, 2018), pp. 434-435, XP033375710, DOI: 10.1109/CBMS.2018.00082 [retrieved on Jul. 20, 2018].
Guillaume Bellec et al: "Deep Rewiring: Training very sparse deep networks", arxiv.org, Cornell University Library, 201 Olin Library Cornell University Ithaca, NY 14853, Nov. 14, 2017 (Nov. 14, 2017), XP081319720, Aug. 7, 2018 publication date.
Bernhard Nessler et al: "Bayesian computation emerges in generic cortical microcircuits through spike-timing-dependent plasticity", PLoS Computational Biology, vol. 9, No. 4, Apr. 25, 2013 (Apr. 25, 2013), p. e1003037, XP055218935, DOI: 10.1371/journal.pcbi.1003037.
Michael Pfeiffer et al.: "Deep Learning With Spiking Neurons: Opportunities and Challenges", Frontiers in Neuroscience, vol. 12, Oct. 25, 2018, XP055570520, CH, ISSN: 1662-4548, DOI: 10.3389/fnins.2018.00774.

\* cited by examiner

RESILIENT NEURAL NETWORK

TECHNICAL FIELD

This disclosure generally relates to automatic signal recognition techniques, and more particularly, to system and method for hardware-resilient deep-learning inference accelerators using spiking neurons.

BACKGROUND

Automatic signal recognition (ASR) refers to the recognition of signals through the identification of their constituent features. ASR is utilized in a range of applications, for example to recognize the voice of a speaker and spoken words in a voice/speech recognition system, to recognize arrhythmias in electrocardiograms (ECG), to determine the shape of a gesture in a motion-controlled system, among others. ASR is typically performed by characterizing patterns present in short samples of an input signal, and thus accurate pattern recognition capabilities are fundamental to an effective ASR system.

Measuring some physical quantities to derive input signals for an ASR system may require the fusion of data from multiple types of sensors. For example, recognizing a hand gesture using a hand-held input device may necessitate the fusion of data from an accelerometer, to measure motion, and data from a gyroscope, to measure orientation. Combining data from both sensors enables the detection of gestures in three-dimensional space.

In general, data fusion refers to the integration of data gathered from disparate, and potentially heterogeneous sources, in order to decrease the uncertainty in interpretation of data from those individual sources. It is important that during the fusion process, essential features in the disparate input signals are adequately represented in the fused signal.

Pattern recognition and fusion are typically performed using microprocessors, and/or digital signal processors, both of which implement a stored program architecture. This architecture is inherently inefficient for analytics of streaming data. On a single processor, the extraction and recognition of patterns is carried out sequentially. This is because the pattern extraction and identification are realized in terms of the generic, simplistic instruction sets (e.g. RISC or CISC instruction sets), resulting in lengthy execution sequences for every pattern in the signal sample. Complex patterns in the input signal necessitate the use of more complex signal processing algorithms, which in a system requiring real-time responses from the pattern recognition engine, further necessitates the use of higher clock frequencies for the processor. In power-constrained devices (such as portable electronic devices, wearable devices, etc.), this is not feasible. Furthermore, due to the sequential execution paradigm, the latency and power dissipation of pattern recognition operations on a microprocessor increase greatly as the complexity and repertoire of patterns increases. The presence of noise in the input signals further increases the complexity of analysis, and adversely impacts performance and efficiency.

Data fusion is a non-native operation for microprocessors. This means that before input signals or data streams can be fused, their information content must be extracted, and thereafter combined with corresponding content from other streams. Consequently, in microprocessor implementations, each input signal/data source for fusion is processed separately by independent pattern recognition pipelines, followed by a rule-based framework to combine the disparate pattern recognition outcomes. This approach requires multiple invocations of the pattern recognition infrastructure, for each input signal or data stream, leading to increased power dissipation. Furthermore, the limitations of load-store architecture microprocessors and digital signal processors (DSPs) for pattern recognition mean that as pattern complexity increases, the power and latency costs of recognizing these patterns also increase. While the latency cost can be mitigated by increasing clock frequency, this is achieved at the cost of further increased power dissipation. Similarly, the quality of fusion is limited by the complexity of processing and ASR carried out on input signals, the number of signals being fused, and the computational capabilities of the microprocessor or DSP. The sequential nature of processing reduces the throughput of fusion-based ASR, thus, as complexity of patterns in signals increases, the number of input signals that can be fused using the microprocessor or DSP, decreases.

Artificial neural networks in the form of Deep neural networks (DNNs) have been proposed as an alternative to a microprocessor implementation. DNNs form the basis for large number of machine learning applications; starting with speech and image recognition, the number of applications that utilize DNNs has increased exponentially, but these suffer from intrinsic limitations, mainly for processing large amount of data or fast adaptation to a changing environment.

Initially, hardware deep network accelerators have been implemented on standard synchronous digital logic. The high level of parallelism of neural networks is not replicated in the (typically) serial and time-multiplexed processing in digital systems; conversely, computational primitives of hardware DNN emulator realized as analog computing nodes, where memory and processing elements are co-localized, offer significant improvements in terms of speed, size, and power consumption.

In biological neural network models each individual neuron communicate asynchronously and through sparse events, or spikes. In such event-based spiking neural network (SNN) only neurons who change the state generate spikes and may trigger signal processing in subsequent layers, consequently, saving computational resources. Spiking neural networks (SNN) are a promising means of realizing ASR for many different applications.

SNNs encode information in the form of one or more precisely timed (voltage) spikes, rather than as integer or real-valued vectors. Computations for inference (i.e. inferring the presence of a certain feature in an input signal) are effectively performed in the analog and temporal domains. For this reason, SNNs are typically realized in hardware as full-custom mixed signal integrated circuits. This enables them to perform inference functions with several orders of magnitude lower energy consumption than their artificial neural network counterparts, in addition to having smaller network sizes.

SNNs consist of a network of spiking neurons interconnected by synapses that dictate the strength of the connections between the spiking neurons. This strength is represented as a weight, which moderates the effect of the output of a pre-synaptic neuron on the input to a post-synaptic neuron. Typically, these weights are set in a training process that involves exposing the network to a large volume of labelled input data, and gradually adjusting the weights of the synapses until a desired network output is achieved.

SNNs can be directly applied to pattern recognition and sensor data fusion, relying on the principle that amplitude-domain, time-domain, and frequency domain features in an input signal can be encoded into unique spatial- and temporal-coded spike sequences.

The generation of these sequences relies on the use of one or more ensembles of spiking neurons, an ensemble being a co-operating group of neurons. Each ensemble performs a specific signal processing function, that is to say for example feature encoding, conditioning, filtering, data fusion, classification. Each ensemble consists of one or more interconnected layers of spiking neurons, with the connectivity within and between layers following a certain topology. The size of each ensemble (the number of neurons), their connectivity (topology and number of synapses), and their configuration (weights and number of layers) are dependent on the characteristics of the input signal, for example dynamic range, bandwidth, timescales or complexity of features in the input signal. Consequently, the ensembles used in the case of a voice pattern matching system are likely to differ from those used in a handwriting recognition system.

Commonly, as complexity increases of features to be recognized in an input signal, so does the size of ensembles required to process them. Spiking neural network hardware can utilize configurable arrays of spiking neurons, synapses, connected using a programmable interconnect structure that facilitates the implementation of any arbitrary connection topology. However, in order to implement a large ensemble, it is necessary that the underlying SNN hardware have at least as many neurons and synapses as required.

Although the elementary operations required by an SNN are very efficiently realized by analog electronic circuitry, the unavoidable variation in micro-electronic circuits due to the fabrication process induces distortions in their functional properties, for example resistance, capacitance, gain, time response et cetera. Especially at smaller fabrication process geometries, and lower operating currents, these circuits are increasingly susceptible to quantum effects and external noise, which effectively reduces signal-to-noise ratio and limits processing performance. The impact of these non-idealities is increased in the case of large arrays where the driver, biasing, encoder/decoder circuits are shared by a greater number of devices, over longer interconnects.

SUMMARY

To address the above discussed drawbacks of the prior art, there is proposed, according to a first aspect of the disclosure, a spiking neural network for classifying input signals. The spiking neural network comprising a plurality of spiking neurons, and a plurality of synaptic elements interconnecting the spiking neurons to form the network, wherein each synaptic element is adapted to receive a synaptic input signal and apply a weight to the synaptic input signal to generate a synaptic output signal, the synaptic elements being configurable to adjust the weight applied by each synaptic element. Each of the spiking neurons is adapted to receive one or more of the synaptic output signals from one or more of the synaptic elements, and generate a spatio-temporal spike train output signal in response to the received one or more synaptic output signals. The network is partitioned into multiple sub-networks, wherein each sub-network comprises a sub-set of the spiking neurons connected to receive synaptic output signals from a sub-set of the synaptic elements. The sub-network is adapted to generate a sub-network output pattern signal in response to a sub-network input pattern signal applied to the sub-network. Furthermore, each sub-network forms part of one or multiple cores in an array of cores, each core consisting of a programmable network of spiking neurons implemented in hardware or a combination of hardware and software, and communication between cores in the core array is arranged through a programmable interconnect structure.

In an embodiment, the programmable interconnect structure comprises a switchable matrix.

In an embodiment, the switchable matrix comprises a plurality of routers adapted to route a plurality of output signals from a first core in the core array to a plurality of inputs of a second core in the core array.

In an embodiment, the programmable interconnect structure forms a packet switching network between the cores in the core array. In an embodiment, the programmable interconnect structure uses an address-event representation. In an embodiment, the programmable interconnect structure uses synchronous or asynchronous communication. In an embodiment, the core array is implemented in an integrated circuit and the programmable interconnect structure comprises a network-on-a-chip.

In an embodiment, the network-on-chip is real-time configurable.

In an embodiment, either a learning rule, weight storage mechanism or communication protocol to the synaptic elements is heterogeneously applied in a single core of the core array. In an embodiment, either a learning rule, weight storage mechanism or communication protocol to the synaptic elements is heterogeneously applied over a plurality of the cores in the core array. In an embodiment, a learning rule configuration of one or more of the cores in the core array is implemented using a learning rule block. In an embodiment, the cores using the same learning rule use a common learning rule block which implements the learning rule.

In an embodiment, the distribution of learning rules within each core and/or over the cores in the core array is dynamically configurable at runtime.

In an embodiment, one of the sub-networks is a part of a classifier for classifying input signals of the sub-network.

In an embodiment, one of the sub-networks is a part of an ensemble of classifiers for classifying input signals to that sub-network. In an embodiment, the weights of the synaptic elements are configured using stochastic weight updates.

In an embodiment, the weights of the synaptic elements are bounded by bound values, wherein the bound values are stochastic values.

According to a second aspect of the disclosure, an integrated circuit is disclosed comprising the spiking neural network implemented in the core array of a first aspect of the disclosure.

According to a third aspect of the disclosure a method is disclosed of partitioning and mapping a spiking neural network onto a core array. Here, the spiking neural network comprises a plurality of spiking neurons, and a plurality of synaptic elements interconnecting the spiking neurons to form the network, wherein each synaptic element is adapted to receive a synaptic input signal and apply a weight to the synaptic input signal to generate a synaptic output signal, the synaptic elements being configurable to adjust the weight applied by each synaptic element, and wherein each of the spiking neurons is adapted to receive one or more of the synaptic output signals from one or more of the synaptic elements, and generate a spatio-temporal spike train output signal in response to the received one or more synaptic output signals. Furthermore, the core array comprises multiple cores, wherein each core consists of a programmable network of spiking neurons implemented in hardware or a combination of hardware and software and wherein the communication between cores in the core array is arranged through a programmable interconnect structure. Here, the method comprises that the network is partitioned into multiple sub-networks, wherein each sub-network comprises a sub-set of spiking neurons connected to receive synaptic output signals from a sub-set of the synaptic elements. The sub-network is adapted to generate a sub-network output pattern signal from the sub-set of spiking neurons, in response to sub-network input pattern signal applied to the sub-set of synaptic elements, wherein each sub-network is mapped onto the one or multiple cores.

In an embodiment, the partitioning of the spiking neural network into the sub-networks implemented in the one or more cores is determined by a mapping methodology. The mapping methodology comprises a constraint-driven partitioning. The constraint is a performance metric linked to the function of each respective sub-network.

According to a fourth aspect of the disclosure, a spiking neural network is disclosed. The spiking neural network comprises a plurality of spiking neurons implemented in hardware or a combination of hardware and software, and a plurality of synaptic elements interconnecting the spiking neurons to form the network, wherein each synaptic element is adapted to receive a synaptic input signal and apply a weight to the synaptic input signal to generate a synaptic output signal, the synaptic elements being configurable to adjust the weight applied by each synaptic element, and wherein each of the spiking neurons is adapted to receive one or more of the synaptic output signals from one or more of the synaptic elements, and generate a spatio-temporal spike train output signal in response to the received one or more synaptic output signals. Furthermore, a learning rule, weight storage mechanism and/or communication protocol is heterogeneously applied over the neurons and/or the synaptic elements in the spiking neural network.

According to a fifth aspect of the disclosure, a spiking neural network is disclosed comprising a spiking neuron, and a synaptic element connected to the spiking neuron. Here, the synaptic element comprises a first and second receptor adapted to receive a synaptic input signal, wherein the first and second receptor respectively generate a first and second receptor signal on the basis of the synaptic input signal. The synaptic element applies a weight to the first receptor signal to generate a synaptic output signal, the synaptic element being configurable to adjust the weight applied by the synaptic element at least on the basis of the second receptor signal. The spiking neuron is adapted to receive the synaptic output signal from the synaptic element, and generate a spatio-temporal spike train output signal at least in response to the received synaptic output signal.

In an embodiment, the neuron emits a control signal, wherein the control signal adjusts, together with the second receptor signal, the weight applied by the synaptic element.

In an embodiment, the control signal is a back-propagating signal.

In an embodiment, the neuron comprises a dendrite, axon and soma, wherein the control signal stems from the dendrite and/or axon and/or soma of the neuron.

In an embodiment, the control signal comprises one or more spikes generated by an action potential in the neuron. In an embodiment, the decay time of the first receptor is faster than the decay time of the second receptor. In an embodiment, the first receptor generates a sourcing or sinking current for the spiking neuron.

In an embodiment, the first receptor comprises a low-pass filter. In an embodiment, the second receptor forms a voltage-gated receptor. In an embodiment, the second receptor comprises a low-pass filter, band-pass filter, high-pass filter and/or amplifier. In an embodiment, the first receptor is an AMPA receptor, or a GABA receptor, or a NMDA receptor.

According to a sixth aspect of the disclosure, a method is disclosed for adjusting the weight of a synaptic element in a spiking neural network, the spiking neural network comprising a spiking neuron connected to the synaptic element. The synaptic element comprises a first and second receptor adapted to receive a synaptic input signal, wherein the first and second receptor receive the synaptic input signal and respectively generate a first and second receptor signal on the basis of the synaptic input signal. The synaptic element applies a weight to the first receptor signal to generate a synaptic output signal. On the basis of at least the second receptor signal the weight of the synaptic element is adjusted, and the spiking neuron receives the synaptic output signal from the synaptic element and generates a spatio-temporal spike train output signal at least in response to the received synaptic output signal.

In an embodiment, the neuron emits a control signal, wherein the control signal adjusts, together with the second receptor signal, the weight applied by the synaptic element.

In an embodiment, the control signal is a back-propagating signal.

In an embodiment, the neuron comprises a dendrite, axon and soma, wherein the control signal stems from the dendrite and/or axon and/or soma of the neuron.

In an embodiment, the control signal comprises one or more spikes generated by an action potential in the neuron. In an embodiment, the decay time of the first receptor is faster than the decay time of the second receptor. In an embodiment, the first receptor generates a sourcing or sinking current for the spiking neuron.

In an embodiment, the first receptor comprises a low-pass filter. In an embodiment, the second receptor forms a voltage-gated receptor. In an embodiment, the second receptor comprises a low-pass filter, band-pass filter, high-pass filter and/or amplifier. In an embodiment, the first receptor is an AMPA receptor, or a GABA receptor, or a NMDA receptor.

According to a seventh aspect of the present disclosure, an integrated circuit is disclosed comprising the spiking neural network of the fifth aspect of the present disclosure.

According to an eight aspect of the present disclosure, a method is disclosed for configuring a spiking neural network to diminish noise effects in the spiking neural network. The spiking neural network comprises a plurality of spiking neurons implemented in hardware or a combination of hardware and software, and a plurality of synaptic elements interconnecting the spiking neurons to form the network. Each synaptic element is adapted to receive a synaptic input signal and apply a weight to the synaptic input signal to generate a synaptic output signal, the synaptic elements being configurable to adjust the weight applied by each synaptic element. Each of the spiking neurons is adapted to receive one or more of the synaptic output signals from one or more of the synaptic elements, and generate a spatio-temporal spike train output signal in response to the received one or more synaptic output signals. The synaptic drive $\Gamma_i$ of one of the spiking neuron i in the spiking neural network is a time-dependent function describing a total transfer function of all synaptic elements that are connected into the neuron. The method comprises obtaining an expression for the variance of each of the synaptic drives $\Gamma_i$, the expression for the variance depending on a control parameter. The variance of each of the synaptic drives $\Gamma_i$ is adjustable by adjusting the control parameter. The control parameter is adjusted such that the variance of each of the synaptic drives $\Gamma_i$ lies below a predetermined value such that the synaptic drive $\Gamma_i$ of each of the neuron i in the spiking neural network is bound around an equilibrium point $\Gamma^*_i$ of the synaptic drive $\Gamma_i$ where noise effects are minimal.

In an embodiment, the synaptic drive $\Gamma_i$ of the spiking neuron i in the spiking neural network can be written in vector form for all neurons in the spiking neural network as $\Gamma=(\Gamma_i, \ldots, \Gamma_n)^T$, with n the number of neurons in the spiking neural network, and wherein $\Gamma$ satisfies the formula:

$$d\Gamma = N(\Gamma(t))dt + \sigma(\Gamma(t))d\omega(t),$$

where N (F (t)) is a nominal matrix part and $\sigma(\Gamma)$ is a state-dependent noise matrix for the Gaussian white noise process $d\omega(t)$, where $\omega$ is a Wiener process which describes noise in the spiking neural network, wherein the expression for $d\Gamma$ is rewritable in terms of the variance-covariance matrix K(t) of $\Gamma(t)$ satisfying the following continuous-time algebraic Lyapunov equation:

$$N(\Gamma(t))K(t) + K(t)[N(\Gamma(t))]^T + \sigma(\Gamma(t))[\sigma(\Gamma(t))]^T = 0,$$

wherein the step of obtaining an expression for the variance of each of the synaptic drives $\Gamma_i$ comprises determining the diagonal values of the variance-covariance matrix K(t).

In an embodiment, the equilibrium point $\Gamma^*_i$ of the synaptic drive $\Gamma_i$ can be written in vector form for all neurons in the spiking neural network as $\Gamma^*=(\Gamma^*_1, \ldots, \Gamma^*_n)^T$, for which the noise matrix a is zero, i.e. $\sigma(\Gamma^*)=0$.

In an embodiment, the control parameter is adjusted by means of a computer simulation.

According to a ninth aspect of the present disclosure, a spiking neural network is disclosed, comprising a plurality of spiking neurons implemented in hardware or a combination of hardware and software, and a plurality of synaptic elements interconnecting the spiking neurons to form the network. Each synaptic element is adapted to receive a synaptic input signal and apply a weight to the synaptic input signal to generate a synaptic output signal, the synaptic elements being configurable to adjust the weight applied by each synaptic element. Each of the spiking neurons is adapted to receive one or more of the synaptic output signals from one or more of the synaptic elements, and generate a spatio-temporal spike train output signal in response to the received one or more synaptic output signals. The synaptic drive $\Gamma_i$ of one of the spiking neuron i in the spiking neural network is a time-dependent function describing a total transfer function of all synaptic elements that are connected into the neuron. The variance of each of the synaptic drives $\Gamma_i$ lies below a predetermined value such that the synaptic drive $\Gamma_i$ of each of the neuron i in the spiking neural network is bound around an equilibrium point $\Gamma^*_i$ of the synaptic drive $\Gamma_i$ where noise effects are minimal.

BRIEF DESCRIPTION OF DRAWINGS

Embodiments will now be described, by way of example only, with reference to the accompanying schematic drawings in which corresponding reference symbols indicate corresponding parts, and in which.

The figures are intended for illustrative purposes only, and do not serve as restriction of the scope or the protection as laid down by the claims.

DESCRIPTION OF EMBODIMENTS

Hereinafter, certain embodiments will be described in further detail. It should be appreciated, however, that these embodiments may not be construed as limiting the scope of protection for the present disclosure.

Figure 1:
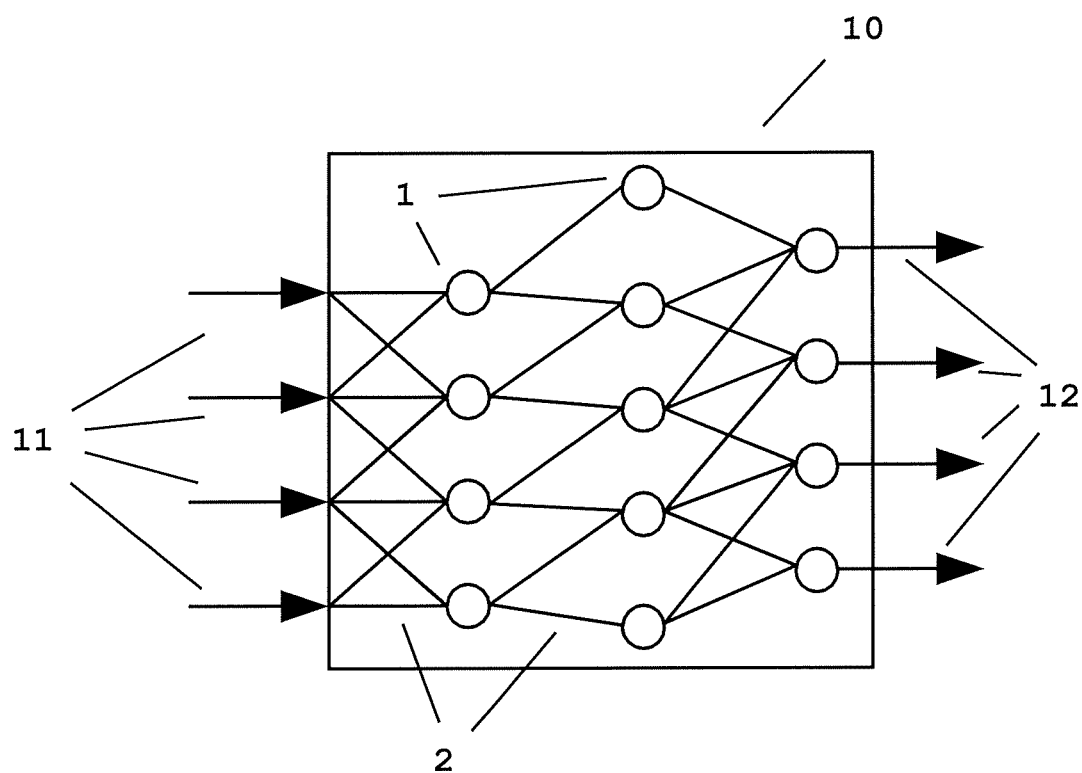
FIG. 1 shows an exemplary neural network, consisting of neurons and synaptic elements.

FIG. 1 is a simplified diagram of a neural network 100. The neurons 1 are connected to each other via synaptic elements 2. In order to not clutter the drawing, only a small number of neurons and synaptic elements are shown (and only some have a reference numeral attached to them). The connecting topology shown in FIG. 1, i.e. the way in which the synaptic elements 2 connect the neurons 1 with each other, is merely an example and many other topologies may be employed. Each synaptic element 2 can transmit a signal to an input of a neuron 1, and each neuron 1 that receives the signal can process the signal and can subsequently generate an output, which is transmitted via further synaptic elements 2 to other neurons 1. Each synaptic element 2 has a certain weight assigned to it, which is applied to each synaptic input signal that the synaptic element receives and transmits, to produce a weighted synaptic output signal. The weight of a synaptic element is thus a measure of the kind of causal relationship between the two neurons 1 that are connected by the synaptic element 2. The relationship can be causal (positive weight), anti-causal (negative weight) or non-existent (zero weight).

The neurons 1 and synaptic elements 2 can be implemented in hardware, for example using analog circuit elements or digital hardwired logic circuits. They can also be implemented partly in hardware and partly in software, or entirely in software.

Implementation in hardware or least partly in hardware is preferred, i.e. a hardware circuit or element is used to perform the functions of the individual neurons, rather than using a large processor executing software where the software mimics individual neurons. These (part) hardware implementations achieve faster processing, e.g. enabling much faster pattern recognition, and event-driven processing in which blocks of neurons and synaptic elements are only activated when needed.

The neural network 100 can be a spiking neural network. The neurons 1 are then spiking neurons, which generate a neuron output signal in the form of one or more spikes or neuron generated events. The spiking neurons 1 may be configured to fire (i.e. generate an output spike) only when a membrane potential (e.g. an energy potential, or voltage or current level) within the neuron reaches a predetermined threshold value. The membrane potential of the spiking neuron changes as a result of the received input signals, i.e. the synaptic output signals received by the neuron from the synaptic elements are accumulated, integrated, or otherwise processed to alter the membrane potential. When a weight of a synaptic element 2 is positive, a synaptic output signal received from that synaptic element excites the spiking neurons 1 which receive the signal, raising their membrane potentials. When a weight of a synaptic element 2 is negative, a synaptic output signal received from that synaptic element inhibits the spiking neurons 1 which receive the signal, lowering their membrane potentials. When a weight of a synaptic element 2 is zero, a synaptic output signal received from that synaptic element does not have any effect on the spiking neurons 1 which receive the signal.

When the membrane potential of a spiking neuron 1 reaches the threshold value, the neuron fires, generating a spike at the time of firing, and the membrane potential is reduced as a result of the firing. If the membrane potential subsequently again reaches the threshold value, the neuron will fire again, generating a second spike. Each spiking neuron 1 is thus configured to generate one or more spikes in response to input signals received from the connected synaptic elements 2, the spikes forming a spatio-temporal spike train. Since a spiking neuron 1 only fires when its membrane potential reaches the predetermined threshold value, the coding and processing of temporal information is incorporated into the neural network 100. In this way, spatio-temporal spike trains are generated in the spiking neural network 100, which are temporal sequences of spikes generated by the spiking neurons 1 of the network 100.

The temporal characteristics of the spike trains encode amplitude and frequency features of the input signal. The temporal characteristics comprise: the latency between onset of stimulus (e.g. an input signal from a synaptic element) and generation of a spike at the output of a neuron; the latency between successive spikes from the same neuron; and the number of spikes fired by the neuron in the time duration for which the input stimulus is applied.

The synaptic elements 2 can be configurable such that for example the respective weights of the synaptic elements can be varied, for example by training the neural network 100. The neurons 1 can be configurable in the way they respond to a signal from a synaptic element. For example, in the case of spiking neural networks, the neurons 1 can be configured in the way a certain signal increases or decreases the membrane potential, the time it takes for the membrane potential to naturally decay towards a resting potential, the value of the resting potential, the threshold value that triggers a spike of the spiking neuron 1. The configuration of the neurons 1 can for example be kept constant during training, or be variable and set in a training of the neural network 100 on a particular training set.

Input signals 11 are for example multiple, disparate, sampled input signals, or spatio-temporal spike trains. The input can be an analog-to-digital converted value of a signal sample, or the digital value of the sample in the case of for example an analog or digital integrator, or the analog value of the sample in the case of an analog integrator.

Output signals 12 of the neural network 100 are for example spatio-temporal spike trains, which can be read out from the output neurons 1 and further classified and transformed by an output transformation stage into a set of digital values corresponding to the type of output code selected by the user.

Figure 2:
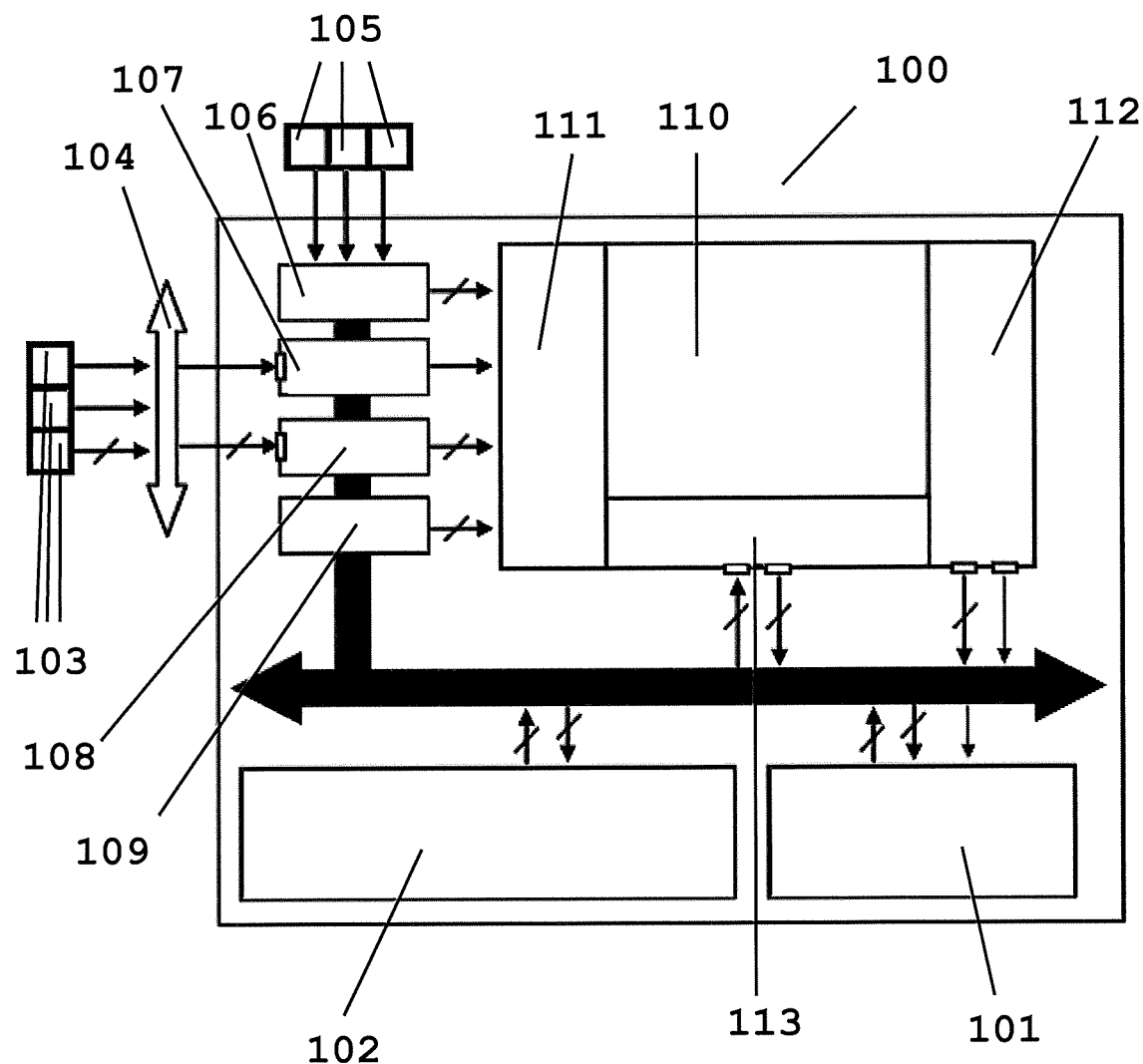
FIG. 2 shows schematically a spiking neural network within a microcontroller integrated circuit.

FIG. 2 illustrates one embodiment of the high-level architecture of the microcontroller integrated circuit 100 comprising a spiking neural network 110. In this context, microcontrollers 110 are economical means of data collection, sensing, pattern recognition and actuating the physical signals.

The spiking neural network 110 is connected to one or more streaming input data ports 111, which provide the spiking neural network 110 with input which will be converted into spatio-temporal spike trains. The spiking neural network 110 is connected to one or more output ports 112. A memory mapped control and configuration interface 113 controls the configuration parameters of the spiking neural network 110, for example the synaptic weights and/or the neuron configuration and further can include peripherals (e.g. A/D converters, D/A converters, bandgaps, PLLs) and circuits for control and adaptation of neuron, synapse and plasticity (learning) circuits, among others. The interface 113 reads out a memory device 102 where the settings for the spiking neural network 110 are saved and sends signals to the spiking neural network 110 to set the hardware accordingly. The interface 113 could send analog signals to the spiking neural network 110. The settings could include configuration parameters of each neuron 1 or synaptic element 2 of the spiking neural network 110, or the network topology.

Each neuron 1 can have a set of configuration parameters that control the precise firing behaviour of that neuron 1. For example, the neuron may be designed with a firing threshold, which represents a threshold of a voltage, energy, or other variable which accumulates in the neuron as a result of receiving inputs, and where the neuron generates an output spike (such as a voltage, current or energy spike) when the accumulated variable meets or exceeds the firing threshold. The neuron may implement an integration function which integrates the inputs to the neuron to determine the adjustment to the accumulated variable. In addition, the neuron may also be designed with: (a) a leakage rate, which represents the rate at which the accumulated variable in the neuron decays over time; (b) a resting value of the accumulated variable, which represents the value to which the accumulated variable will decay over time in the absence of any input signals to the neuron; (c) an integration time constant, which represents the time over which an input signal is integrated to determine any increase in the accumulated variable in the neuron; (d) a refractory level, which represents the value of the accumulated variable in the neuron immediately after firing of the neuron; (e) a refractory period, which represents the time period required for the accumulated variable in the neuron to rise to the resting value after firing of the neuron. These parameters may be predetermined and/or configurable and/or adjustable for each neuron. By adjusting for example the firing threshold, leakage rate, integration time constant, and refractory period of the neuron to match the energy content of a critical input signal feature, the neuron 1 will generate one or more precisely timed spikes when stimulated with an input signal containing that feature.

Configuration parameters of the synaptic elements 2 include the weight and gain of a synaptic element 2. The weight of the synaptic element 2 is typically used to adjust the synaptic element 2, while the gain of the synaptic element 2 is used for amplification of the signal in hardware and typically concerns a low pass filter implementation. Typically the gain is fixed at initialisation of the network 110, while the weight can change based on the evolution/training of the spiking neural network 110.

The microcontroller integrated circuit 100 further comprises a microprocessor core 101 to perform computations and control of the integrated circuit 100. For example, the microprocessor core 101 can oversee the communication between the memory mapped control and configuration interface 113 and the memory device 102.

The memory device 102 can be any computer-readable storage media. The memory device 102 may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media, e.g., hard disk drive or any type of solid-state random-access semiconductor memory, flash memory, on which alterable information may be stored.

External buses 104 are connected to one or multiple sensors or other data sources 103. The microcontroller integrated circuit 100 can also be directly attached to sensors 105. The sensors can first go through an analog-to-digital convertor 106. One or multiple serial input/output ports 107, and general purpose input/output ports 108 can be present on the microcontroller integrated circuit 100. Direct access of external equipment can be arranged to the memory of the microcontroller integrated circuit 100 by direct memory access (DMA) 109.

Figure 3:
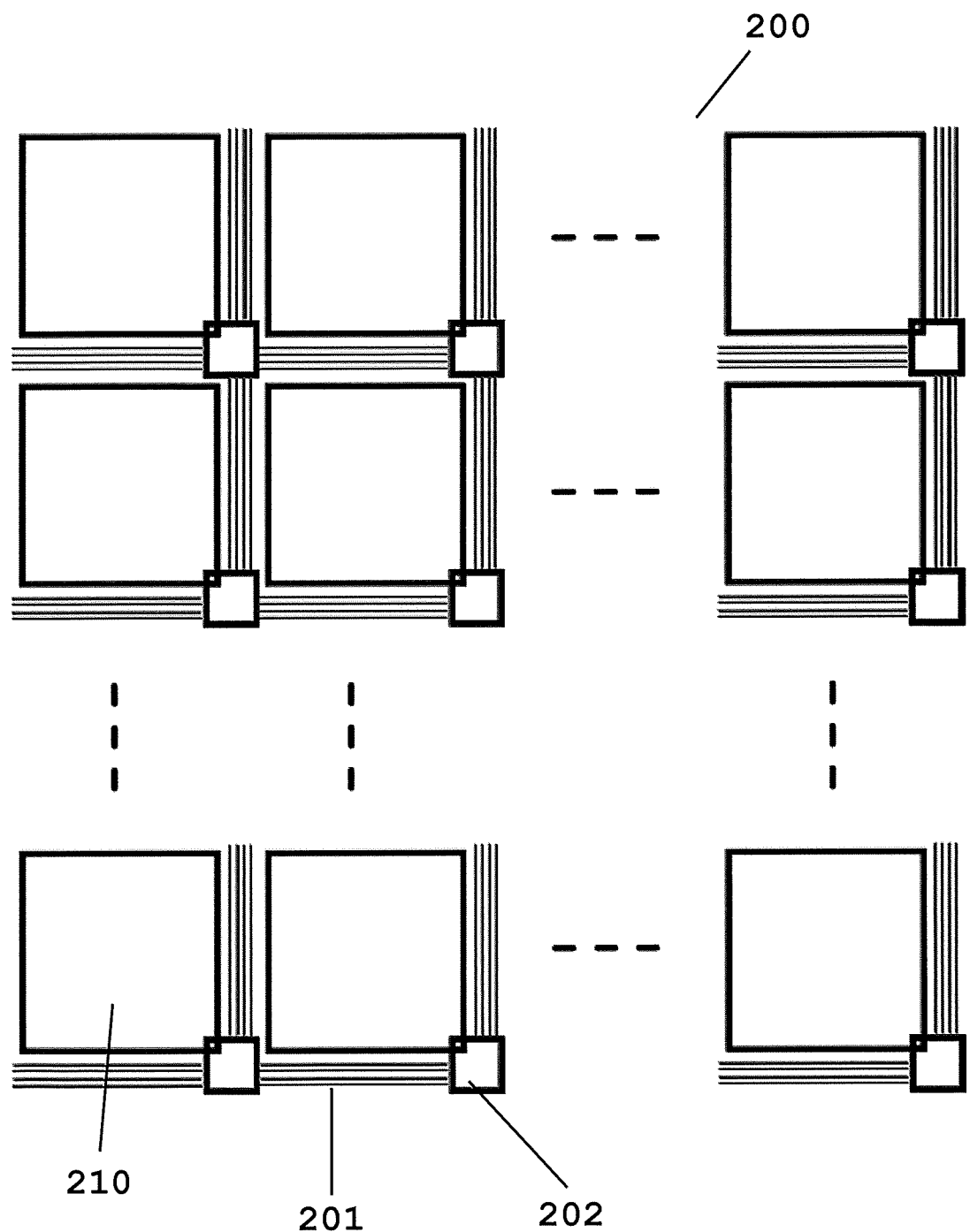
FIG. 3 shows the high-level architecture for learning systems with an array of neuromorphic cores.

FIG. 3 shows the high-level architecture for learning systems with plurality of neuro-synaptic cores 210 arranged in an array of cores 200. Each core 210 comprises a network of neurons 1 implemented in hardware, the neurons interconnected by synaptic elements 2. A single core 210 may implement a complete spiking neural network, or a portion of a spiking neural network forming a separate sub-network. In this way, a large spiking neural network can be partitioned into a number of smaller sub-networks, each sub-network being implemented in one of the cores 210 of the array 200. In one embodiment, the cores 210 may implement a spiking neural network 110 with associated input data ports 111, output ports 112, and/or control and configuration interface 113 shown in FIG. 2.

By partitioning large spiking neural networks 110 into smaller sub-networks and implementing each of the sub-networks on one or more cores 210, each with their own requisite circuitry, some of the non-idealities of circuits operating at smaller process geometries, and lower operating currents are mitigated, especially for large arrays. The core-based implementation approach thus reduces the impact of physical non-idealities.

A sub-network, or ensemble of neurons that form a co-operative group can for example form a classifier, an ensemble of classifiers, groups of neurons that handle data conversion, feature encoding or solely the classification, et cetera.

In such a regime, a large network of ensembles is partitioned and mapped onto an array of cores, each of which contains a programmable network of spiking neurons. Each core consequently implements a single ensemble, multiple small ensembles (in relation to the number of neurons and synapses in the core), or in the case of large ensembles, only a part of a single ensemble, with other parts implemented on other cores of the array. The modalities of how ensembles are partitioned and mapped to cores is determined by a mapping methodology. The mapping methodology can comprise a constraint-driven partitioning. The constraint can be a performance metric linked to the function of each respective sub-network. The performance metric could be dependent on power-area limitations, memory structures, memory access, time constants, biasing, technology restrictions, resilience, a level of accepted mismatch, and network or physical artifacts.

The periphery of the array 200 includes rows of the synaptic circuits which mimic the action of the soma and axon hillock of biological neurons. Further, each neuro-synaptic core 210 in the array 200 has a local router 202, which communicates with the routers 202 of other cores 210 within a dedicated real-time reconfigurable network-on-chip.

The local routers 202 and their connections 201 form a programmable interconnect structure between the cores 210 of the core array 200. The cores 210 are connected through a switchable matrix. The different cores 210 of the core array 200 are thus connected via the programmable interconnect structure. In particular, the different parts of the spiking neural network implemented on different cores 210 of the core array 200 are interconnected through the programmable interconnect structure. In this way, quantum effects and external noise only act on each core individually, but not on the network as a whole. Hence, these effects are mitigated.

The implemented spiking neural network 110 on the core array 200 can have high modularity, in the sense that the spiking neural network 110 has dense connections between the neurons within cores 210 but sparse connections between different cores 210. In this way, noise and quantum effects are reduced even more between cores while still allowing for sub-networks to increase for example classification accuracy by allowing high complexity.

The programmable interconnect structure can form a packet switching network between the cores 210 in the core array 200. For example, the local routers 202 can group data into packets that is then transmitted over the connections 201. These connections 201 can form a digital network. Packets can be made of a header and a payload. Data in the header is used by the local routers 202 to direct the packet to its destination core 210 where the payload within the packet is extracted and used. The data can for example be output of one of the sub-networks of the spiking neural network that was partitioned and implemented on one or more cores 210 of the core array 200. The data can also be input from a sensor or another external device.

The programmable interconnect structure could also use an address-event representation where the address of the neurons to be connected is send to a different core.

Furthermore, either synchronous or asynchronous communication could be used. An example of synchronous communication is any clock-based communication, while an example of asynchronous communication is for example a handshaking protocol.

The cores in the core array can form a network-on-chip on the microcontroller integrated circuit 100. The network-on-chip improves the scalability and the power efficiency of the microcontroller integrated circuit 100.

The topology for the Network-on-Chip, for example mesh, torus, tree, ring, star, is selected based on the parameters of the system. The routing algorithm in use depends on both the topology and the characteristics of the network 110. The complexity of routing algorithms can be increased by, for example, considering multiple shortest routes to a target and, subsequently, selecting one of these paths randomly for each flit (resulting in better network load). Additional efficiency can be obtained by using heuristics and information about the network load at any given time. Other types of routing approaches exist, including static routing tables or source-based routing.

The network-on-chip can be real-time reconfigurable, or statically defined during the production phase. When the network-on-chip is real-time reconfigurable, the settings of the cores 210 in the core array 200 and their interconnect structure settings can be altered. This alteration can be done based for example on changing input or output of the microcontroller integrated circuit, different demands on accuracy or stability of the classification, the evolution of the network based on its learning rules and a change in communication protocols.

The present invention encompasses that the neuro-synaptic cores 210 could apply a homogeneous learning rule, weight storage type and/or communication protocol to the synapse matrix. In other words, within one core a homogeneous learning rule, weight storage type and/or communication protocol can be set.

The entire spiking neural network 110 can be implemented as one single entity implemented within one core 210 (for example as a crossbar structure of neurons 1 and synapses 2 with all feedback connections in place to implemented any recurrent neural network structure (or a simple feedforward network without any feedback signals). Alternatively, the entire spiking neural network 110 can be spread across multiple cores 210, where each core 210 implements, for example, particular layer(s), or part of a layer, in the context of deep neural networks. Decision on how to split the network is entirely based on the application case (e.g. radar, lidar, image, ultrasound, biopotential sensing).

In an embodiment, all the neuro-synaptic cores 210 could apply the same learning rule, weight storage type and/or communication protocol to each of their synapse matrixes.

In an embodiment, the neuro-synaptic cores 210 could apply different learning rules, weight storage types and/or communication protocols to each of their synapse matrixes.

In an embodiment, neurosynaptic array of the entire spiking neural network 110 could be organized as a single core 210 implementing heterogeneous learning rules depending on the optimal performance-power-area trade-off.

In another embodiment, different regions of a synapse matrix within a core 210 can be configured with the same learning rule, which could be implemented by a common learning rule block that is driven by the same configuration register. The size of this region of the synapse matrix within the core 210 can be configurable either at design time in order to create a specialized circuit, or dynamically at runtime wherein the synapse matrix within the core 210 will have a heterogeneous clustering of synaptic circuits, each cluster implementing a different learning rule. This heterogeneous clustering may require a special mapping or a synthesis algorithm to map each neuron unit to the determined clusters of the synapse matrix within the core 210 based on the applied learning rule.

The learning rule block could be implemented per synaptic element, per group of synaptic elements or per core 210 of the core array 200. The learning rule block can consist of circuitry, for example implemented in the configuration interface 113.

In another embodiment, different sets of one or more cores 210 within the core array 200 can be configured with the same learning rule, which could be implemented by a common learning rule block that is driven by the same configuration register. The size of this set of cores 210 within the core array 200 can be configurable either at design time in order to create a specialized set of cores 210, or dynamically at runtime wherein the core array 200 will have a heterogeneous clustering of cores 210, each cluster implementing a different learning rule. This heterogeneous clustering may also require a special mapping or a synthesis algorithm to map each neuron unit to the determined cluster of cores 210 based on the applied learning rule.

It is possible to implement different/heterogeneous learning rules also within a single core 210, and not only across cores 210.

Because different sets of cores 210 of the core array 200, and different regions of the synapse matrix within cores 210 can implement different learning rules, the design is more flexible. Furthermore, by applying different learning rules, a particular input will have a different effect on particular regions of the core array 200. In this way, an optimization can take place over the different regions having the different learning rules implemented, resulting in a better functioning overall network 110. Finally, different learning rules might work better for different input signals, such that the network can be tailored to what learning rule is needed in which part of the network.

Further, in an embodiment, each region of a synapse matrix within one core 210 or a set of one or more cores 210 within the core array 200 can also implement a different weight storage mechanism such as digital memory, capacitive storage, bi-stability mechanism, wherein each region will have different power requirements.

A set of cores 210 within the core array 200 can implement a different communication protocol. This makes the design more flexible. The cores 210 of the core array 200 thus allow for a practical and flexible implementation of the spiking neural network 110 into hardware, particularly because these allow for the same or different learning rules, weight storage types and/or communication protocols being applied to each of their synapse matrixes Cognitive ability of the brain emerges from a joint form of computation or ensemble neuronal activity, i.e. co-operating groups of neurons (subnetworks or ensembles) create functional neural states that trigger learning and intensify the comprehensive perception capability, and compensate reduced sensory modality, where joint activity of groups of neurons overcome the unreliable, stochastic nature of a single neuron firing.

Subsequently, numerous architectures can be used that attempt to reflect aspects of the biology: multiple (parallel) classifiers, which function on the same stimuli or on various parts or features of the stimuli remedying a variety of machine learning complexities, such as feature selection, confidence estimation, missing feature, incremental learning, error correction, et cetera. The feature space of an input signal can be partitioned using multiple classifiers. An ensemble of neural networks that are configured similarly can be utilized to improve classification performance. With a boosting procedure a strong classifier (with an arbitrarily low error on a binary classification problem) can be constructed from an ensemble of classifiers; the error of any of these classifiers that constitute the ensemble is merely better than that of random guessing.

Consequently, based on (i) the selection of training data for individual classifiers, (ii) the specific procedure used for generating ensemble members, and/or (iii) the combination rule for obtaining the ensemble decision, multiple ensemble systems can be devised including for example bagging, random forests (an ensemble of decision trees), composite classifier systems, mixture of experts (MoE), stacked generalization, consensus aggregation, combination of multiple classifiers, dynamic classifier selection, classifier fusion, committee of neural networks, and classifier ensembles.

Figure 4:
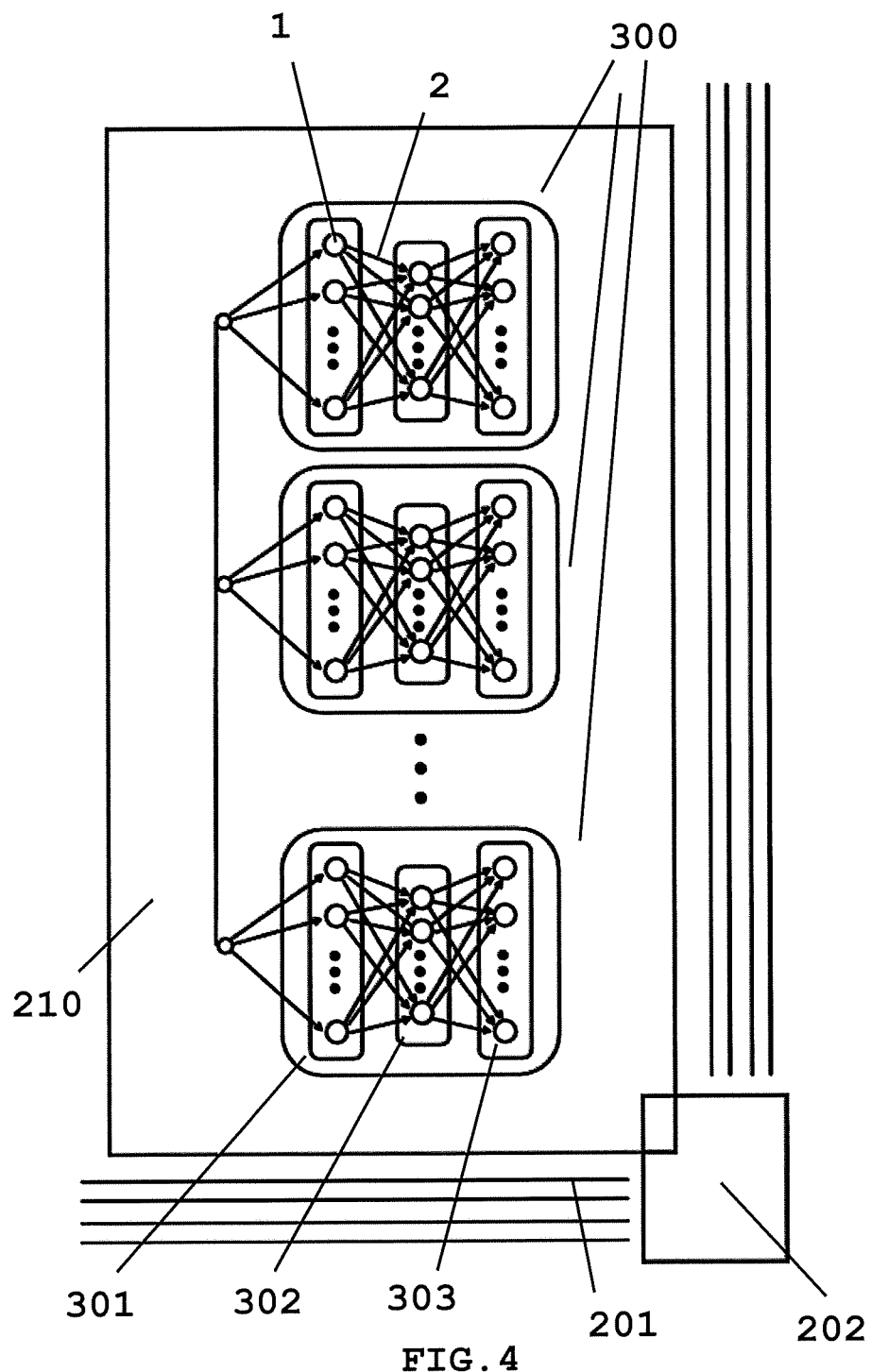
FIG. 4 shows a graphical representation of the boosting algorithm within a single core.

FIG. 4 shows a graphical representation of a boosting algorithm within a single core 210 of the core array 200. In FIG. 4, multiple classifiers 300 are shown implemented within a single core 210 of the core array 200. The classifiers 300 form an ensemble of classifiers 300.

The ensemble of classifiers 300 is an example of a sub-network of the spiking neural network 110 that can be implemented on a single core 210 of the core array 200.

A classifier 300 is assumed to have a set of output neurons (one for each class) each of which fires an event (spike) according to its firing probability distribution. A particular classifier 300 can comprise different layers 301,302,303 of neurons 1 (or neurons 1 and synaptic elements 2) connected by synaptic elements 2. Each layer can have different functionalities, for example layer 301 can perform data conversion, layer 302 can perform feature encoding, and layer 303 can perform classification. There can also be an output layer present in each classifier 300. The output layer might be connected to the local router 202 of the particular core 210 of the core array 200. Using the connections 201 between the local routers 202, the output of particular classifier 300 or a ensemble of classifiers 300 can be directed to other cores 210 in the core array 200, and in this way to other sub-networks of the spiking neural network 110.

Figure 5:
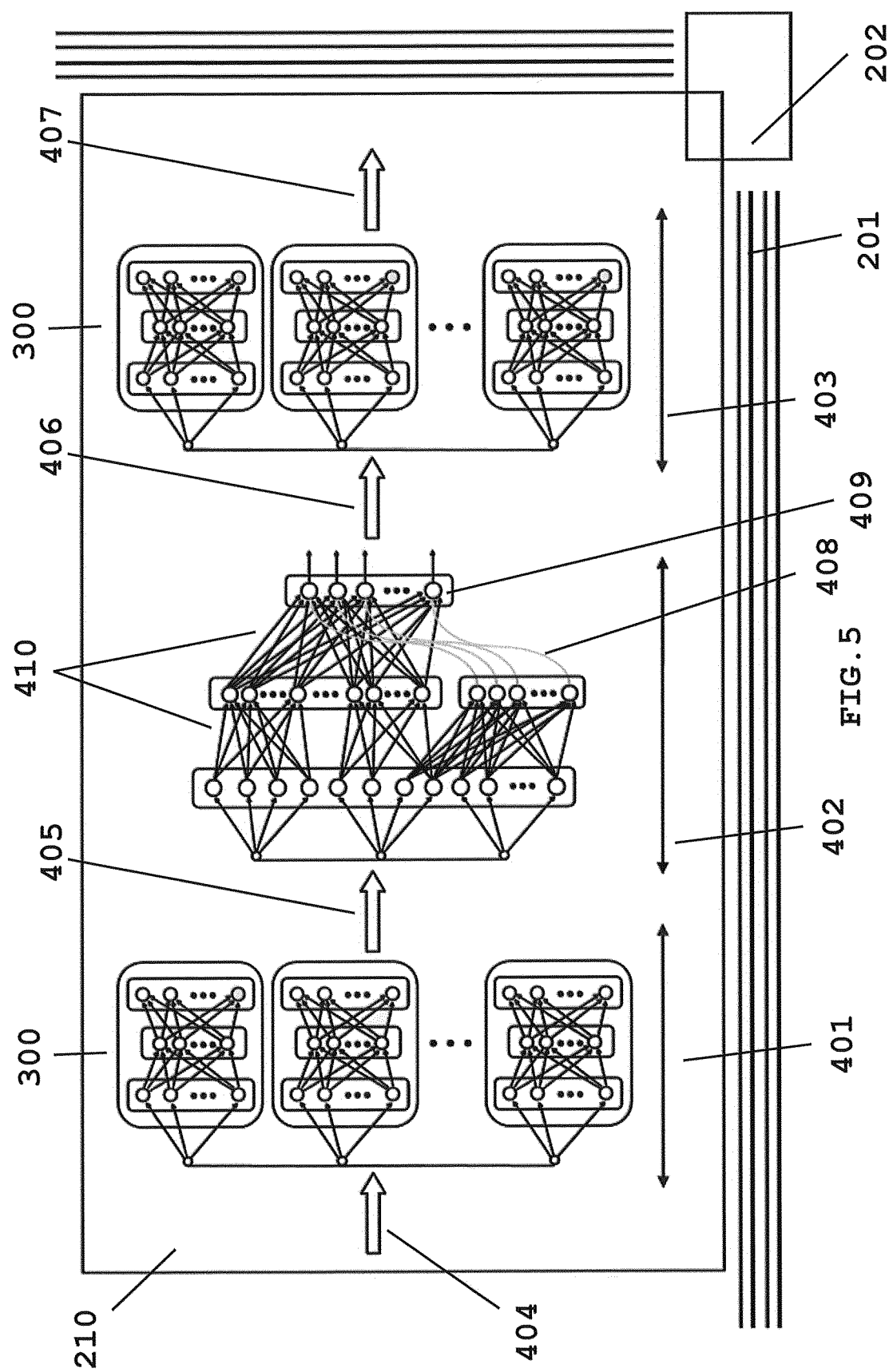
FIG. 5 shows a graphical representation of combining multiple ensemble systems within a single core.

FIG. 5 shows a graphical representation of combining multiple ensemble classifier systems within a single core 210 of the core array 200.

First, an ensemble 401 of classifiers 300 which are implemented based on a boosting algorithm receives input 404 and subsequently sends its output to a second ensemble 402 which is implemented based on a Mixture of Experts algorithm. The synaptic elements 410 between layers can be trained using tripled-based spike timing dependent plasticity (T-STDP) as a learning rule. With STDP, if an input spike to a neuron 1 tends, on average, to occur immediately before that neuron's 1 output spike, then that particular input is made somewhat stronger. If an input spike tends, on average, to occur immediately after an output spike, then that particular input is made somewhat weaker by adjusting the weight. Thus, inputs that might be the cause of the post-synaptic neuron's 1 excitation are made even more likely to contribute in the future by adjusting the weight up of the particular synaptic element 2, whereas inputs that are not the cause of the post-synaptic spike are made less likely to contribute in the future by lowering the weight of the particular synaptic element 2. This STDP method is pair based, since it uses a pair of spikes. T-STDP differs from normal STDP in that a triplet of spikes is used.

Using a gating network 408, the data partitioning is set among the experts during training, and to combine the outputs. The gating network 408 can be used during training as a so-called 'golden reference', it defines the filter or transfer function for pooling of the different expert outcomes and acts as a teacher signal. The experts compete to learn the training patterns, and the gating network 408 mediates the competition. A pooling and combining system 409 pools and combines the output of all the different experts into one output 406, and outputs the output 406 of the Mixture of Experts layer as input to a third ensemble 403 of classifiers 300 implemented based on a boosting algorithm. The output 407 of the third ensemble 403 can be outputted to the local router 202 of the core 210 and via the interconnections 201 be sent to other cores 210 of the core array 200 or to output ports 112 of the spiking neural network 110.

Figure 6:
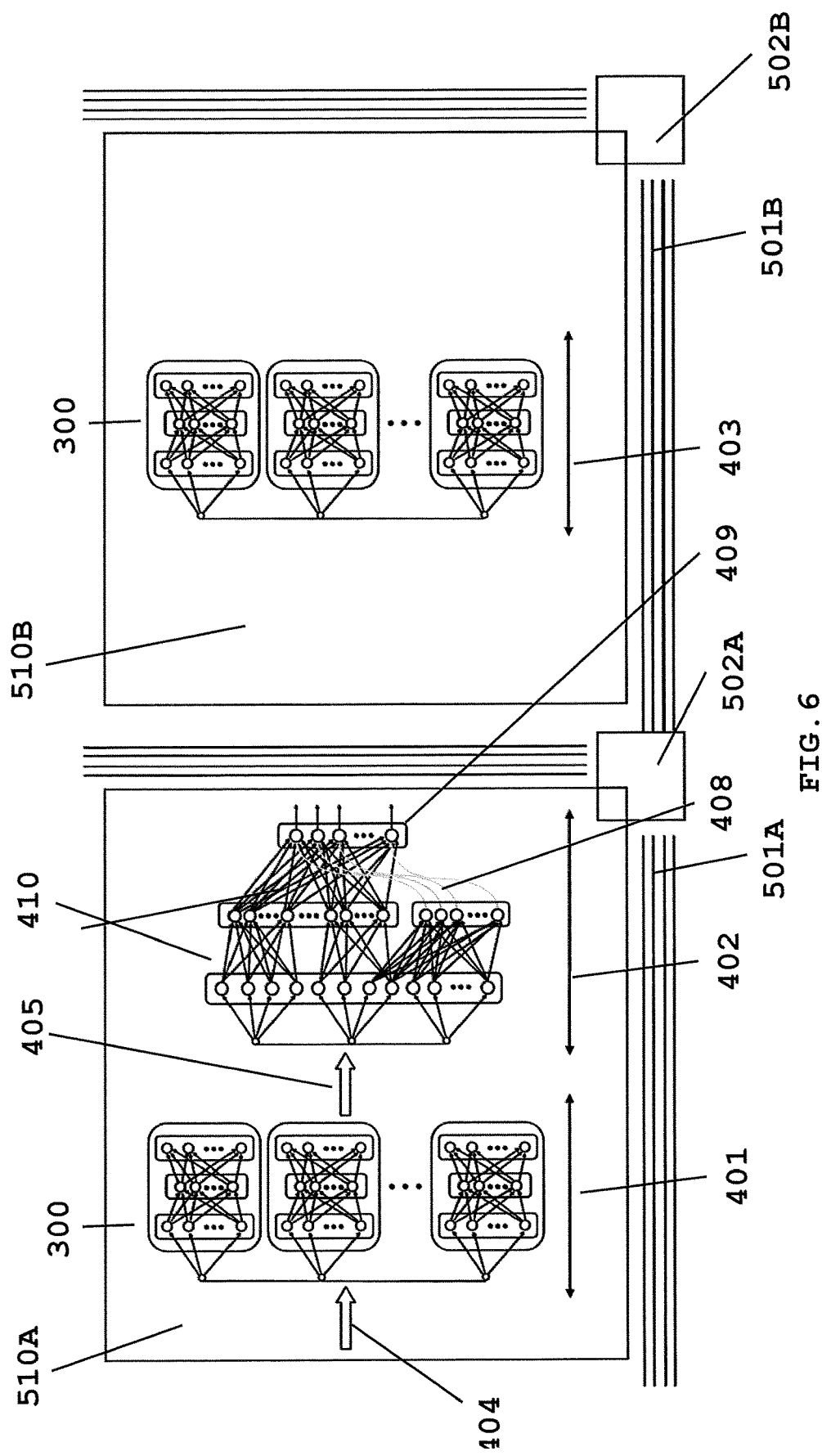
FIG. 6 shows a graphical representation of combining multiple ensemble systems over multiple cores in a multi-core implementation.

FIG. 6 shows a graphical representation of combining multiple ensemble systems over multiple cores in a multi-core implementation.

First, in a first core 510A an ensemble 401 of classifiers 300 which are implemented based on a boosting algorithm receives input 404 and subsequently sends its output to a second ensemble 402 which is implemented based on a Mixture of Experts algorithm. The pooling and combining system 409 of the second ensemble 402 outputs its output to a first local router 502A of the first core 510A, which then sends this output via the interconnections 501A,501B towards a second local router 502B of a second core 510B. This data is then used as input for a third ensemble 403 present on the second core 510B. This system is thus different from the system shown in FIG. 5 in that the spiking neural network 110 is partitioned in a manner and mapped onto the core array 200 in a different manner. Namely, in this embodiment the ensembles are split over two different cores 510A,510B; each with their own requisite circuitry.

Devising a dynamic model, which represents subsequent merging of the classifier outputs, compels a scheme for allocating each distinctive unlabeled pattern to the best-fitting classifier. The classifier is defined as a stochastic winner-takes-all, where only a single neuron can spike for any data presented at the input. Trainable combiners can determine which classifiers are accurate in which part of the feature space, and subsequently, can be combined accordingly.

Without loss of the generality, in the boosting algorithm the equality of the weak and strong probably approximately correct (PAC) learning models is a prerequisite, i.e. generating different distributions where dissimilar sub-hypotheses are trained. Probably approximately correct (PAC) learning is a framework for mathematical analysis in computational learning theory in machine learning. Here, the learner receives samples and must select a generalization function from a certain class of possible functions. The goal is that, with high probability ("the probably" part), the selected function will have low generalization error (the "approximately correct" part).

In contrast, the adaptive mixture of experts gains enhanced performance by allocating different subtasks to diverse learners. The majority of the ensemble learning algorithms, for example stacking, train the elementary predictors in first instance and subsequently attempt to adjust the combination model.

Mixture-of-Experts and boosting were intended for different categories of problems, which lead to distinctive advantages and disadvantages. In boosting, the distributions are designated mainly to enable individual classifiers to progress as an expert on the data patterns where the former classifiers are erroneous or disagree. In the Mixture-of-Experts, however, the data patterns are separated into basic but consistent subsets; subsequently, the learning process required for individual subsets is not as complex as in the original data pattern.

Identical gating functions are employed for both, to set the data partitioning among the experts during training, and to combine the outputs. A gating network is typically trained using an expectation-maximization (EM) algorithm on the original training data.

Each ensemble or combination of the ensembles can be implemented in one or multiple cores 210.

Figure 7A:
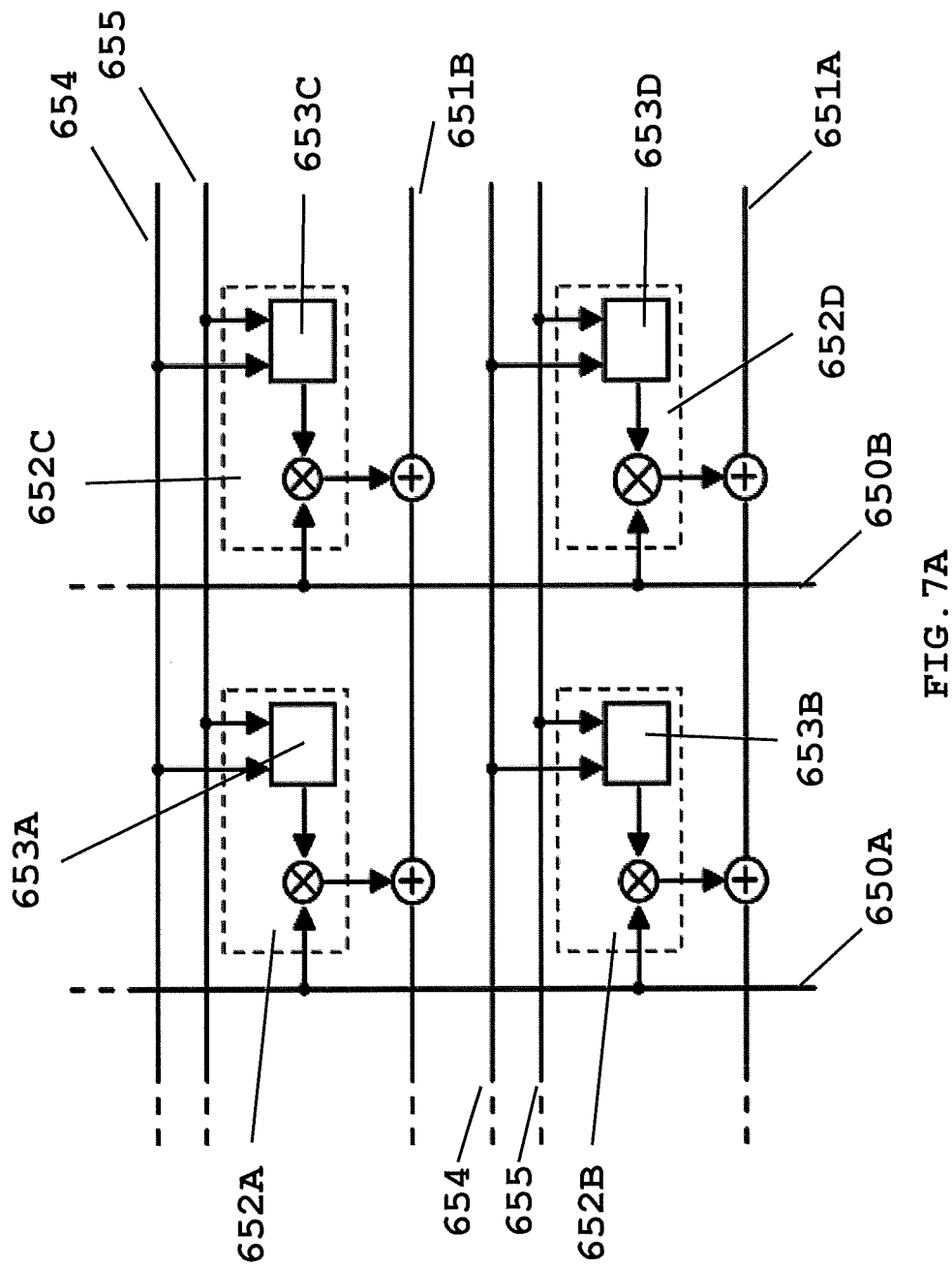
FIG. 7A shows a conceptual diagram of a synaptic structure.

In an embodiment shown in FIG. 7A, a hardware implementation of a synapse matrix with synaptic elements 652A-D within a core 210 is shown. The synaptic elements 652A-D each have a respective weight 653A-D attributed to them. One can write $w_{2,1}$ for the first weight 653A, $w_{1,1}$ for the second weight 653B, $w_{2,2}$ for the third weight 653C, and $w_{1,2}$ for the fourth weight 653D.

Input signal 650A to synaptic elements 652A,652B can be written as $X_1$, while input signal 650B to synaptic elements 652C,652D can be written as $X_2$. This can be a voltage spike as part of a spatio-temporal spike train. In each synaptic element 652A,652B the input signal 650A is multiplied with the respective weight 653A,653B. In each synaptic element 652C,652D the input signal 650B is multiplied with the respective weight 653C,653D. The output signal 651A can then be written as $\Sigma_i w_{1,i} x_i$, while the output signal 651B can be written as $\Sigma_i w_{2,i} x_i$. These output signals 651A,651B can be send to one or multiple neurons.

The weights 653A-D of the synaptic elements 652A-D can be set by using one or multiple enable lines 654 and error lines 655. The enable line 654 enables the weights 653A-D and sets the correct value known to the system, while the error line 655 updates the weights 653A-D based on a perceived error in the weight settings. These signals can be analog or digital.

In another embodiment, each of the neuro-synaptic ensembles can be implemented as a combination of multiple (synaptic) receptors and a dendrite (input) and an axon-soma (output) of a biological neuron. This is shown in FIG. 7B.

Figure 7B:
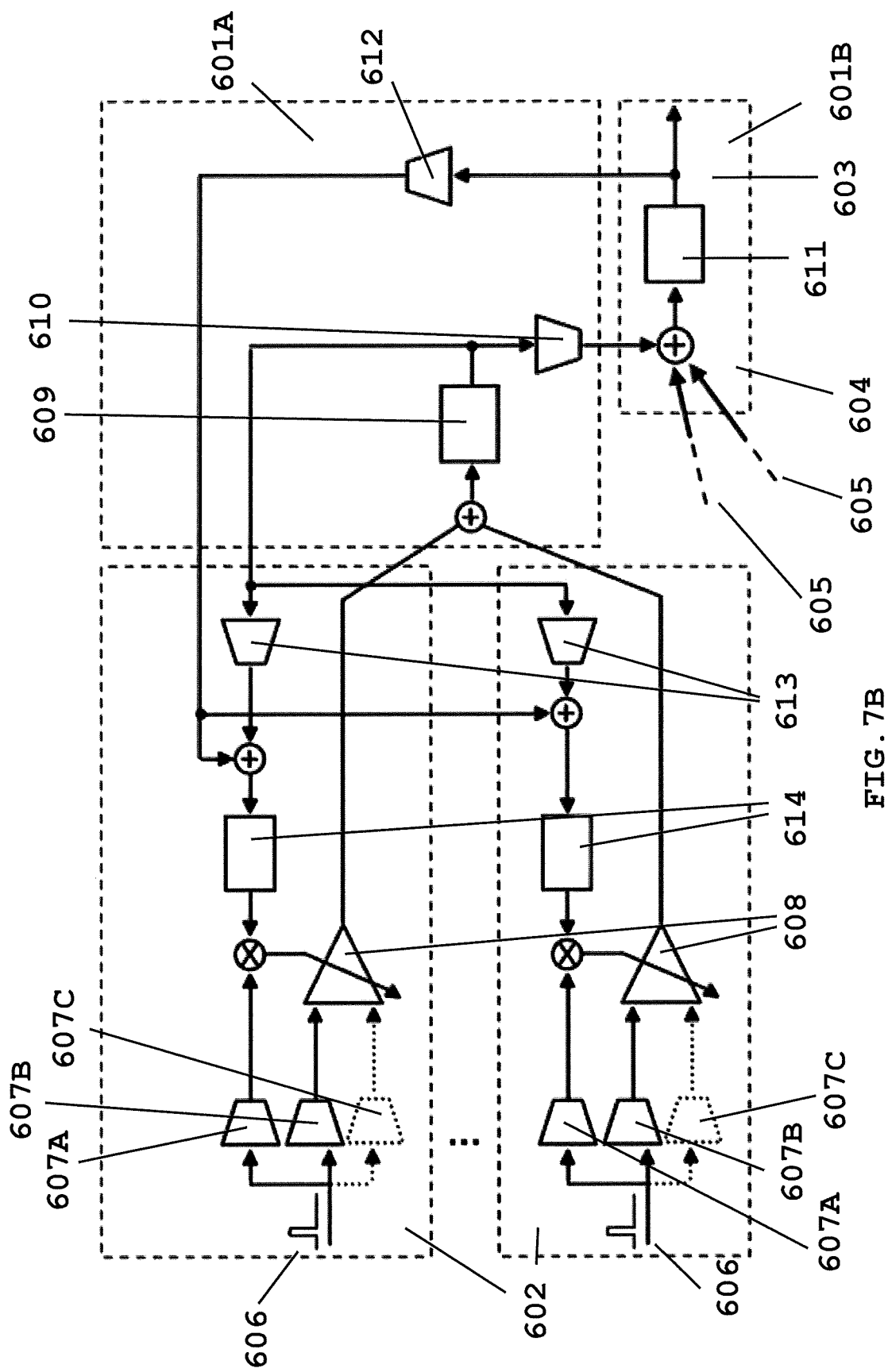
FIG. 7B shows a conceptual diagram of a neuro-synaptic structure.

FIG. 7B shows one or more synaptic elements 602. Spikes 606 part of spatio-temporal spike trains enter the synaptic element 602. At the input of the computational element, three receptors are accessible: NMDA receptors (rNMDA) 607A offer activity-dependent modifications of the synaptic weight w, while AMPA receptors (rAMPA) 607B facilitate a fast synaptic current to drive the soma with a sourcing current, finally GABA receptors (rGABA) 607C can facilitate fast or slower inhibitory synaptic currents with a sinking current, depending on whether GABAA or GABAB receptors are used. The output of the rAMPA 607A and/or rGABA 607C can be used as input to an amplifier 608.

In this embodiment, one can also have rNMDA 607A and either rAMPA 607B or rGABA 607C. Importantly, one can use receptors 607A-C with different temporal components. rAMPA 607B and rGABA 607C can be implemented as low-pass filters. While, rNMDA 607A can be implemented as a voltage-gated receptor having both amplification and filtering, connected to the pre-synaptic circuitry of the implemented learning rule. The filtering can consist of a band-pass, low-pass and high-pass filter.

The output of the amplifier 608 is send to a dendrite 601A, which forms part of a neuron connected to the synaptic elements 602. The output from all the synaptic elements 602 is then integrated over time by an integrator 609. The integrated signal is send through a receptor 610 into the axon-soma 601B of the neuron, consisting of an axon 603 and a soma 604. Signals from other clusters 605,606 of synaptic elements can also enter the axon-soma 601B at this point. A different integrator 611 can be placed in the axon-soma 601B. When a spike is released by the axon 603 generating an action potential it leaves the axon-soma 601B and can for example be send as a spike in a spatio-temporal spike train towards other synaptic elements.

Receptors 612 and 613 obtain back-propagated signals respectively from the dendrite 601A and from the axon-soma 601B. These are added in for example the synaptic elements, a time-derivation 614 is done, and the resulting signal is multiplied with the rNMDA 607A signal to modify the amplifier 608 and hence the weight of each synaptic element 602.

This increase in dimensionality allows more states and transitions (and time constants), offering more flexibility in the implementation of homeostatic plastic and metaplastic interactions, i.e. providing mechanism for the adaptation to the environment changes, and consequently, means to realize and maintain robust neural computation.

In engineering terms, homeostatic plasticity is a form of back-propagating signal control that balance the effect of drifts in the neurons activity or internal connectivity as a consequence of changes in external conditions or temperature variations.

Even though this concept has a vital role in hardware design of spiking neural networks 110 as it offers robustness to the operating conditions variations, a limited number of previous implementations include homeostatic plasticity mainly as a result of the technological constrains involved in realizing the long-time constants in silicon.

The implemented synaptic element 602 allows realization of numerous computational capabilities, for example a wide range of receptors time constants and conductance values $g_m$, axonal and dendritic delays, optimal synaptic transfer functions.

Activity-dependent plasticity of synaptic transmission which underlie learning and memory is mainly attributed to postsynaptic changes in the biophysical properties of the receptors.

To modulate the flow of the synaptic current, each receptor is designated as a multi-(trans)conductance channel modelling nonlinear characteristics such as the multi-binding cooperativity of the neurotransmitter to the receptors. Synaptic currents mediated by NMDA receptors 607A are regulated by synaptic activity. Fast modification of receptor numbers at synaptic elements 602 is functioning as a control mechanism for activity-dependent changes in synaptic efficacy through formation, stability, morphology, and density of synaptic contacts. If groups (bursts) of dendritic spikes are sufficient to exceed the threshold, the axon 603 will generate action potentials; the ensuing spike is back-propagated into the dendrite 601A, and together with soma 604 signals multiplied and added to NMDA receptor 607A signals to, subsequently, generate the weight control. This quasi-local homeostasis framework offers a normalization function without disrupting Hebbian plasticity, effectively keeping net synaptic activation constant through graded adjustments in postsynaptic strength.

Both hardware implementations of FIG. 7A and FIG. 7B do not necessarily have to be used within a multicore implementation of the invention, but any spiking neural network 110 can be implemented in any hardware in this manner.

Each of the combined ensemble systems operates according to biologically-plausible mechanisms, for example a mixture-of-experts non-linear gating mechanism is based on spike-timing dependent plasticity (STDP), a combination of STDP and activity-dependent changes in the excitability of neurons induce Bayesian information processing (referred to as spiking expectation-maximization (SEM) networks).

The proposed ensemble architecture can utilize such SEM networks as the individual ensemble units (classifiers). The learning rule used in SEM is a weight dependent Hebbian triplet TSTDP rule. It is assumed that a classifier has a set of output neurons (one for each class), each of which fires an event (spike) according to its firing probability distribution. The classifier adheres to the stochastic winner-takes-all (sWTA) mechanism, where only a single neuron 1 can fire for any presented input data.

Every synapse $w_{ij}$ assembles the activation statistics of its input $y_i$ (the presynaptic neuron), if its output (the postsynaptic neuron) fires. These statistics can be collected at runtime from samples of the augmented input distribution. From this data each weight can be interpreted as a logarithmic product of two local virtual counters in each synapse, i.e. the one representing the number of the events, and the one representing a local learning rate $\eta_{ij}$.

Consequently, we can derive the spike-event triggered stochastic online learning rule:

$$w_{ij}^{new} = w_{ij} + \eta_{ij} z_i (y_i e^{-w_{ij}} - 1).$$

This approximates in the synapse $w_{ij}$ the log of the running average of output at the spiking times of neuron $z_i$.

The (random) variables used to set the stochastic weight updates in the spiking neural network 110 are independent and identically distributed. Due to the stochasticity introduced in the transitions, the classifiers learn varied representations of the target class. Subsequently, the classifiers responses are combined in an aggregated, improved classifier. In addition, by adding uncertainty in the bound values of the synaptic weights, the level at which classifier decision is activated can be controlled.

Neurons 1 communicate in a spiking neural network 110 predominantly through fast all-or-none events, i.e. spikes in its membrane electric potential. The relative spike firing times in a neuronal population are assumed as the information code, and synchronization between neuron populations as a signal to encode and decode information. Consequently, the neuro-electric characteristics of excitatory and inhibitory neuron networks can be expressed as the following formula:

$$d\Gamma_i(t)/dt = -\frac{1}{\tau_i}\Gamma_i(t) + \lambda_i f_i \sum_{j=1}^n (w_{ji}\Gamma_j(t) + v_{r,i}(t)). \quad (1)$$

Here $\Gamma_i(t)$ is the i-th synaptic drive at time t which essentially denotes the synaptic strength and is defined in terms of the synaptic weight and gain function, $\lambda_i$ is the gain, which regulates exponential decay of the synaptic voltages and mimics a spike-time dependent scaling of the input conductance, function $f_i(\ldots)$ represents the i-th neuron firing rate, $w_{ji}$ are constants designating the coupling between the j-th neuron on the i-th neuron, and $v_{r,i}(t)$ denotes the input voltage to the i-th neuron, for example nerve impulses from sensory receptors. The i-th neuron is the post-synaptic neuron, while the j-th neuron is the pre-synaptic neuron for the connecting synaptic element with weight $w_{ji}$. The synaptic drive $\Gamma_i$ of a neuron i can be seen as the total transfer function of all synaptic elements that drive the neuron i, it can be a function of for example the exponential decay value, weight and gain of the synaptic elements that drive the neuron i et cetera.

However, neurons are noisy, both in the generation of spikes and in the transmission of synaptic signals. The noise originates from the quantal releases of neural transmitters, the random openings of ion channels, the coupling of background neural activity, et cetera.

Subsequently, the noise induces neuronal variability, increase the neuron sensitivity to environmental stimuli, influence synchronization between neurons, and facilitate probabilistic inference.

We derive the uncertainty model as a Markov process, where stochastic integration is interpreted as an Itô system of stochastic differential equations; consequently, we extend the formula (1) above with time-varying delays and stochastic input uncertainty:

$$d\Gamma(t) = (-\psi\Gamma(t) + \lambda f(\dot{\Gamma}(t)))dt + \sigma(\Gamma(t))d\omega(t). \quad (2)$$

The first two terms in the right hand side of the formula (2) are the deterministic drift and stochastic diffusion parts of the stochastic differential equations, respectively, where we define $$\Gamma(t) \triangleq [\Gamma_1(t), \Gamma_2(t), \ldots, \Gamma_n(t)]^T, f(\Gamma) \triangleq [f_1(\Gamma_1), f_2(\Gamma_2), \ldots, f_n(\Gamma_n)]^T, \quad (3)$$

$$\psi \triangleq \left[\frac{1}{\tau_1}, \frac{1}{\tau_2}, \ldots, \frac{1}{\tau_n}\right], \lambda \triangleq \text{diag}([\lambda_1, \lambda_2, \ldots, \lambda_n]^T),$$

$$\text{and } \dot{\Gamma}(t) \triangleq \begin{bmatrix} \sum_{j=2}^n w_{j1}\Gamma_j[t - \delta_{j1}(t)] \\ 0 \\ \vdots \\ 0 \end{bmatrix} +$$

$$\begin{bmatrix} 0 \\ \sum_{j=1, j\neq 2}^n w_{j2}\Gamma_j[t - \delta_{j2}(t)] \\ \vdots \\ 0 \end{bmatrix} + \cdots + \begin{bmatrix} 0 \\ 0 \\ \vdots \\ \sum_{j=1}^{n-1} w_{jn}\Gamma_j[t - \delta_{jn}(t)] \end{bmatrix}.$$

Here $\omega(t) = [\omega_1(t), \omega_2(t), \ldots, \omega_n(t)]^T$ describes noise in the input voltage and is represented by Brownian motion, i.e. an n-dimensional standard Wiener process, and $\sigma(\Gamma) = \text{diag}([\sigma_1(\Gamma_1), \sigma_2(\Gamma_2), \ldots, \sigma_n(\Gamma_2)]^T)$ represents the state-dependent noise matrix for the Gaussian white noise process $d\omega(t)$. The time-dependent function $\delta_{ji}(t)$ denotes the continuous, time-varying time delay of the signal from the j-th neuron to the i-th neuron at time t, with $\delta_{ji}(t) \geq 0$, $t \geq 0$.

The assumption is made that every entry of the matrices $\psi$ and w of the mean dynamics is synchronously perturbed, e.g. (with $v_{r,i}(t) = 0$).

The assumption is that synaptic inputs are similar to delta-like current pulses, and subsequently, can be modelled as Gaussian white noise is valid for fast AMPA- (decay of order 2 ms) and GABAA-currents (decay of order 5-10 ms); however, for slower currents like NMDA- or GABAB-currents (decay of order 50100 ms) this assumption may not hold true. Consequently, they are modelled as a coloured noise, including the non-zero synaptic time constant within steady-state firing rate requires complex 3-D Fokker-Planck expressions.

Although such methodology is feasible, a more effective approach consists of replacing the variance by a rescaled variance, i.e., noting that the synaptic time constant $\tau_s$ primarily impacts the amplitude of the variations. Accordingly, from the ratio of the voltage-variance for the coloured and the white noise, a synaptic-time-constant-dependent reduction factor can be deduced $\sigma_{red}^2 = \sigma_{I_{sym}}^2(1+k^2)^{-1}$ with $$k = \sqrt{\frac{\tau_s}{\tau_m}},$$

where $\tau_m$ is membrane time constant, and $\sigma_{I_{sym}}$ is the standard deviation of the synaptic current. Hence, the Gaussian white noise theory is still valid, with only replacing the variance $\sigma_{I_{sym}}$ by $\sigma_{red}$.

The goal is to find the variance-covariance matrix of $\Gamma(t)$. Equation 2 is a set of (Itô) stochastic differential equations. From there one derives the variance-covariance matrix of $\Gamma(t)$, which is in essence a system of linear ordinary differential equations with time-varying coefficients. To find a solution, one applies discretization with backward Euler, and consequently arrives at a continuous-time algebraic Lyapunov shown in equation 5 below. These are solved by an iterative approach, and the solution is given in equation 6.

The goal is to find an expression for the variance of the synaptic drive $\Gamma_i(t)$ for all neurons i, since it measures how far the random values of $\Gamma_i(t)$ are spread out from their average value. The variance of the synaptic drive is the expectation of the squared deviation of the synaptic drive from its mean. By finding such an expression, the spiking neural network can be bounded. Namely, the spread of the values of the synaptic drive that results from the noise in the spiking neural network can be limited by tweaking the parameters that make out the expression for the variance such that the variance is smaller, in particular the variance is minimized in a particular hardware implementation.

The diagonal elements $K_{i,i}(t)$ of the variance-covariance matrix K(t) of $\Gamma(t)$ are respectively given by the variance of the synaptic drive $\Gamma_i(t)$. Hence, solving for the variance-covariance matrix K(t) of $\Gamma(t)$ will provide the expression for the variance of the synaptic drive $\Gamma_i(t)$ for all neurons i.

Solving (2) requires first finding $\sigma(\Gamma)$ and then obtaining its matrix square root. We use the stationary statistics of open channels in the Markov channel model to define the noise processes in the conductance models. The general method for constructing $\sigma(\Gamma)$ from deterministic drift and the M number of ion channels (or number of synaptic elements in the spiking neural network) by Goldwyn method can be expressed as:

$$M\sigma(\Gamma(t)) = ((-\psi\Gamma(t) + \lambda f(\dot{\Gamma}(t)))I_{N\times 1}{}^T) \cdot I_{N\times N} - \lambda f(\dot{\Gamma}(t)) \cdot (1_{N\times 1}(-\psi\Gamma(t))^T) - (-\lambda f(\dot{\Gamma}(t)))^T \cdot ((-\psi\Gamma(t))1_{N\times 1}{}^T). \quad (4)$$

Here N is the number of states, $I_{N\times 1}$ is a N×1 column vector with all entries equal to 1, and $I_{N\times N}$ is the N×N identity matrix. In the equilibrium point $\Gamma^*$ where $\sigma(\Gamma^*)=0$, the noise part of equation (2) is zero. Using the above expression (4), we can find the equilibrium point $\Gamma^*$ of the system. In the equilibrium point $\Gamma^*$ the spiking neural network will be stable, i.e. noise will not affect the spiking neural network's behaviour. Next, the bounds of the network are determined by finding an expression for the variance of the synaptic drive $\Gamma_i(t)$ for all neurons i.

Applying Itô's theorem on stochastic differentials, and subsequently, backward Euler, the variance-covariance matrix K(t) of $\Gamma(t)$ (with the initial value $K(0)=E[\Gamma\Gamma^T]$) can be expressed as the continuous-time algebraic Lyapunov equation:

$$(-\psi\Gamma(t)+\lambda f(\dot{\Gamma}(t)))_r K(t_r) + K(t_r)(-\psi\Gamma(t)+\lambda f(\dot{\Gamma}(t)))_r{}^T + [\sigma(\Gamma(t))]_r [\sigma(\Gamma(t))]^T{}_r = 0. \quad (5)$$

K(t) at specific time $t_r$ is computed by solving the system in (5). Small, dense Lyapunov equations are efficiently calculated with the Bartels-Stewart method or Hammarling method. Alternatively, large dense Lyapunov equation can be computed by sign function based techniques. In general, the matrix of the deterministic drift in a neural network is not a full-rank matrix; consequently, we rewrite (5) as a sparse linear matrix-vector system in standard form and solve it with adjusted alternating direction method:

$$K_j = ((-\psi\Gamma(t)+\lambda f(\dot{\Gamma}(t)))_r{}^T - \gamma_j I_n)((-\psi\Gamma(t)+\lambda f(\dot{\Gamma}(t)))_r{}^T + \gamma_j I_n)^{-1} K_{j-1}((-\psi\Gamma(t)+\lambda f(\dot{\Gamma}(t)))_r - \gamma_j I_n)((-\psi\Gamma(t)+\lambda f(\dot{\Gamma}(t)))_r + \gamma_j I_n)^{-1} - 2\gamma_j((-\psi\Gamma(t)+\lambda f(\dot{\Gamma}(t)))_r{}^T + \gamma_j I_n)^{-1}[\sigma(\Gamma(t))]_r[\sigma(\Gamma(t))]^T{}_r((-\psi\Gamma(t)+\lambda f(\dot{\Gamma}(t)))_r + \gamma_j I_n)^{-1} \quad (6)$$

Here $K_j$ have rank of j×n for iterates j=1, 2, ... and n is the number of vectors in $[\sigma(\Gamma)]_r$.

To stabilize the network in (2) to the equilibrium point $\Gamma^*$, e.g. the point $\sigma(\Gamma^*)=0$, where the stochastic perturbation is diminished, we shift the equilibrium point $\Gamma^*$ to the origin with the transformation $\Theta(t)=\Gamma(t)-\Gamma^*$, $$d\Theta(t) = (-\psi\Theta(t)+\lambda g(\dot{\Theta}(t))+u(t))dt + \sigma(\Theta(t))d\omega(t), \quad (7)$$

where $g(\Theta(t))=f(\Gamma(t)+\Gamma^*)-f(\Gamma(t))$, and the controller u(t) set as $$u(t)=\varphi_1\Theta(t)-\varphi_2 \text{sign}(\Theta(t))|\Theta(t)|^\gamma, \quad (8)$$

where $|\Theta(t)|^\gamma = (|\Theta_1(t)|^\gamma, |\Theta_2(t)|^\gamma, \ldots, |\Theta_n(t)|^\gamma)^T$, sign$(\Theta(t))=\text{diag}(\text{sign}(\Theta_1(t)), \text{sign}(\Theta_2(t)), \ldots, \text{sign}(\Theta_n(t)))$, $\varphi_1$, $\varphi_2$ are gain coefficients, and $\gamma$ satisfies $0<\gamma<1$. For $\gamma=0$, u(t) is discontinuous; when $0<\gamma<1$, the controller is a continuous function with respect to $\Theta$; for $\gamma=1$, u(t) is set as an asymptotical stabilization.

Figure 8:
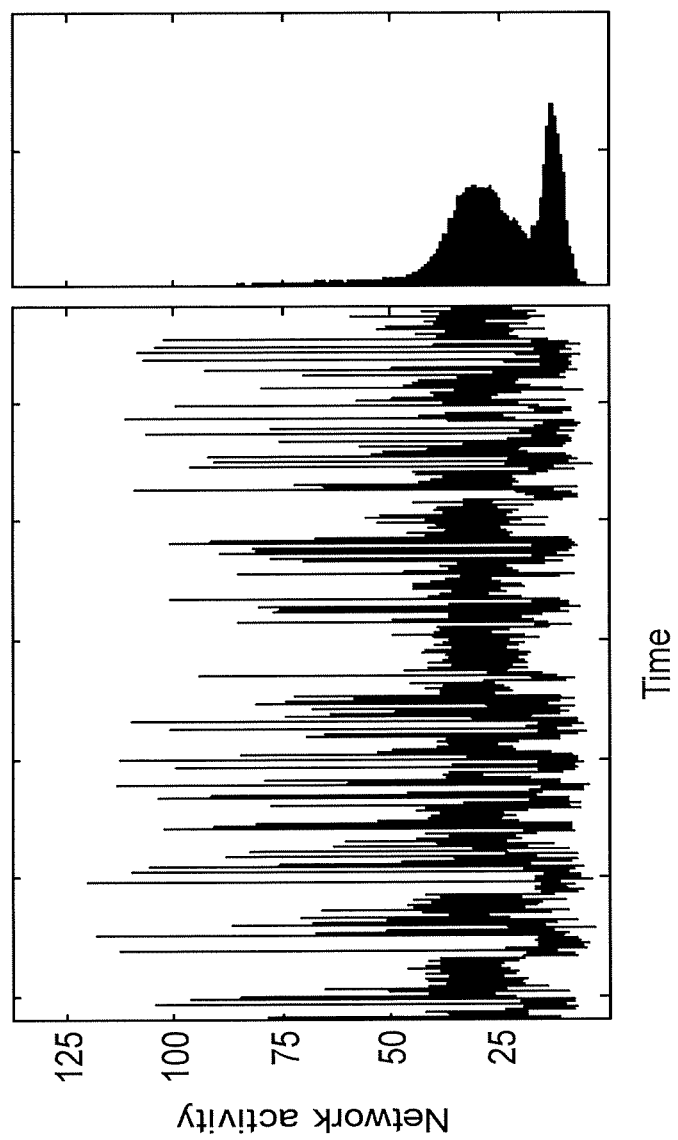
FIG. 8 shows a net activity of an unbounded network.
Figure 9:
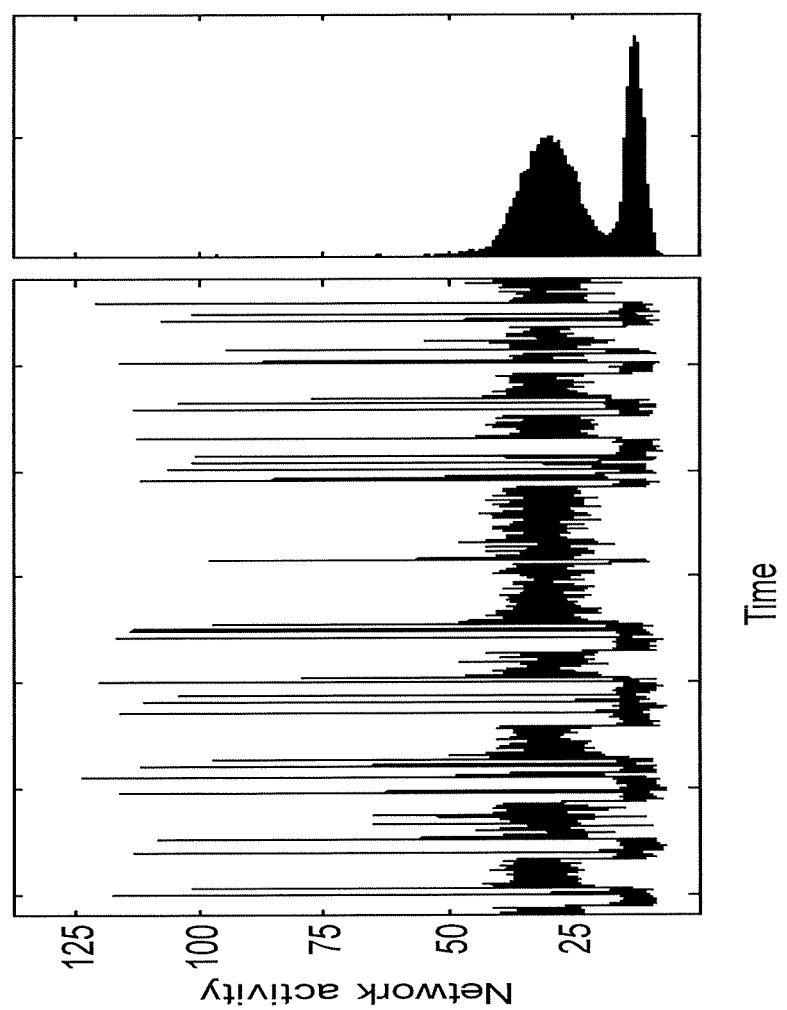
FIG. 9 shows a net activity of a bounded network.

Without loss of generality, FIG. 8 and FIG. 9 illustrate a network activity, and consequently, a mean network activity histogram of an unbounded and bounded network, respectively.

In both figures the input signal to the spiking neural network 110 is the same. However, by bounding the network by making the synaptic drives $\Gamma_i(t)$ of all neurons i within the spiking neural network 110 fall within a particular range around the equilibrium point $\Gamma^*_i$ the bounded neural network does not suffer from noise as much as the unbounded network. The particular range around the equilibrium point $\Gamma^*_i$ is set by choosing the parameters which occur in the expression of the variance of the synaptic drives $\Gamma_i(t)$. The variance of each synaptic drive $\Gamma_i$ lies below a certain value, which depends on a maximum tolerable value for the amount of noise in the network 110. This value can be predefined and depends on the particular application, input signal, accuracy needs of the classification done by the spiking neural network 110, et cetera.

In practice, one can bound the network 110 by for example simulating the network either in hardware or software, and subsequently bounding the network as described above and evaluating the effect. The bounding of the network 110 can be performed during the learning process wherein the weights are set. Noise can be added or simulated artificially in order to test the network's stability when affected by noise.

The above can be implemented in any spiking neural network 110, either implemented in a multicore solution in one particular core 210 in a core array 200, or within a general hardware implementation of a spiking neural network 110.

The invention can be realized as an implementation of reconfigurable multi-layer computation network as an ensemble of multi-receptor multi-dendrite neuro-synaptic structure where each ensemble realize distinctive input-output transfer functions, for example filtering, amplification, multiplication, addition.

In an embodiment a method is devised to set reliability and uncertainty bounds to neuro-synaptic structure or an ensemble of such structures, for the control and adaptability of the classifier responses and activation functions.

In an embodiment an increase in neuro-synaptic structure dimensionality is realized, allowing more states and transitions, offering more flexibility in the implementation of plastic and metaplastic interactions, and various neuronal characteristics, for example delays, or synaptic transfer functions.

In an embodiment multiple learning rules can be implemented where each neuro-synaptic structure in ensemble or a set of ensembles implements a unique learning rule.

In an embodiment one can generate distinctive input-output transfer functions by adaptive control of the amount of electrical charge or representative chemical substances, for example calcium, potassium, sodium.

In an embodiment one can realize fine-grained temporal accuracy to drive precise learning behaviour and improve learning capabilities of neuro-synaptic structures.

In an embodiment one can realize multiple temporal control mechanisms to allow the implementation of a homeostatic regulation in the resulting network.

In an embodiment one can implement multiple signals to model local and global post-synaptic influences.

In an embodiment one can organize a set of ensembles as a reconfigurable neuro-synaptic array.

In an embodiment one can organize a reconfigurable neuro-synaptic structure as computing/signal processing cores, where each core can be organized as a single heterogeneous or a homogenous type implementing specific learning rule, weight storage, et cetera, depending on the optimal performance-power-area trade-off.

The large discrepancy in energy-efficiency and cognitive performance of biological nervous systems and conventional computing is profoundly exemplified with tasks related to real-time interactions with the physical surroundings, in particular in presence of uncontrolled or noisy sensory input. The neuromorphic event-based neuron network, however, due to ability to learn by example, parallelism of the operation, associative memory, multifactorial optimization, and extensibility, is inherent choice for compact and low power cognitive systems that learn and adapt to the changes in the statistics of the complex sensory signals. This new hardware-resilient methodology for the neuromorphic networks allows designs that offer energy-efficient solutions to applications ranging for detecting patterns of biomedical signals (e.g. spike sorting, seizure detection, etc.), classifying images (e.g. handwritten digits), speech commands, and can be applied in wide range of the devices including smart sensors or wearable devices in cyber-physical systems and Internet of Things.

One or more embodiments may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media, e.g., hard disk drive or any type of solid-state random-access semiconductor memory, flash memory, on which alterable information may be stored.

Two or more of the above embodiments may be combined in any appropriate manner.

The invention claimed is:

1. A spiking neural network for classifying input signals, comprising a plurality of spiking neurons implemented in hardware or a combination of hardware and software, and a plurality of synaptic elements interconnecting the spiking neurons to form the network, wherein each synaptic element is adapted to receive a synaptic input signal and apply a weight to the synaptic input signal to generate a synaptic output signal, the synaptic elements being configurable to adjust the weight applied by each synaptic element, wherein each of the spiking neurons is adapted to receive one or more of the synaptic output signals from one or more of the synaptic elements, and generate a spatio-temporal spike train output signal in response to the received one or more synaptic output signals, wherein the weights of the synaptic elements are bounded by bound values, wherein the bound values are stochastic values;

wherein the weight of a synaptic element connected into a spiking neuron i is bounded by bounding the synaptic drive $\Gamma_i$ of the spiking neuron i in the spiking neural network, wherein the synaptic drive $\Gamma_i$ of one of the spiking neuron i is a time-dependent function describing a total transfer function of all synaptic elements that are connected into the neuron; and wherein the variance of each of the synaptic drives $\Gamma_i$; lies below a predetermined value such that the synaptic drive $\Gamma_i$, of each of the neuron i in the spiking neural network is bound around an equilibrium point $\bar{\Gamma}_i$ of the synaptic drive $\Gamma_i$, where noise effects are minimal.

2. The spiking neural network of claim 1, wherein the weights of the synaptic elements are configured using stochastic weight updates.

3. The spiking neural network of claim 2, wherein every synapse assembles the activation statistics of its input, the presynaptic neuron, if its output, the postsynaptic neuron, fires, wherein the activation statistics are collected at run-time from samples of an input distribution.

4. The spiking neural network of claim 3, wherein the weights are updated according to a spike-event triggered stochastic online learning rule given by:

$$w_{ij}^{new} = w_{ij} + \eta_{ij} z_i (y_i e^{-w_{ij}} - 1)$$

wherein $w_{ij}$ is the old weight of a synapse from input neuron i to output neuron j of the spiking neural network, $\eta_{ij}$ a local learning rate, $y_i$ the input of the presynaptic input neuron i, and $z_i$ output at the spiking times of neuron i.

5. The spiking neural network of claim 3, wherein the random variables used to set the stochastic weight updates in the spiking neural network are independent and identically distributed.

6. The spiking neural network of claim 1, wherein the variance is adjustable by obtaining an expression for the variance of each of the synaptic drives $\Gamma_i$, the expression for the variance depending on a control parameter, and wherein the variance of each of the synaptic drives $\Gamma_i$ is adjustable by adjusting the control parameter.

7. The spiking neural network of claim 6, wherein the synaptic drive $\Gamma_i$ of the spiking neuron i in the spiking neural network can be written in vector form for all neurons in the spiking neural network as $\Gamma = (\Gamma_1, \ldots, \Gamma_n)^T$, wherein n is the number of neurons in the spiking neural network, and wherein $\Gamma$ satisfies the formula:

$$d\Gamma = N(\Gamma(t)) dt + \sigma(\Gamma(t)) d\omega(t),$$

where $N(\Gamma(t))$ is a nominal matrix part and $\sigma(\Gamma)$ is a state-dependent noise matrix for the Gaussian white noise process $d\omega(t)$, where $\omega$ is a Wiener process which describes noise in the spiking neural network, wherein the expression for $d\Gamma$ is rewritable in terms of the variance-covariance matrix $K(t)$ of $\Gamma(t)$ satisfying the following continuous-time algebraic Lyapunov equation:

$$N(\Gamma(t))K(t) + K(t)[N(\Gamma(t))]^T + \sigma(\Gamma(t))[\sigma(\Gamma(t))]^T = 0,$$

wherein the step of obtaining an expression for the variance of each of the synaptic drives $\Gamma_i$ comprises determining the diagonal values of the variance-covariance matrix $K(t)$.

8. The spiking neural network of claim 1, wherein the spiking neural network is in a particular core of a core array in a multicore solution, each core consisting of a programmable network of spiking neurons implemented in hardware or a combination of hardware and software, and wherein communication between cores in the core array is arranged through a programmable interconnect structure.

9. The spiking neural network of claim 1, wherein the spiking neural network is a sub-network of a partitioning of a larger spiking neural network into multiple sub-networks, wherein each sub-network comprises a sub-set of the spiking neurons connected to receive synaptic output signals from a sub-set of the synaptic elements, wherein the sub-network is adapted to generate a sub-network output pattern signal in response to a sub-network input pattern signal applied to the sub-network, wherein each sub-network forms part of one or multiple cores in an array of cores, each core consisting of a programmable network of spiking neurons implemented in hardware or a combination of hardware and software, and wherein communication between cores in the core array is arranged through a programmable interconnect structure.

10. An integrated circuit comprising the spiking neural network of claim 1.

11. A method for configuring a spiking neural network to diminish noise effects in the spiking neural network,
wherein the spiking neural network comprises a plurality of spiking neurons implemented in hardware or a combination of hardware and software, and a plurality of synaptic elements interconnecting the spiking neurons to form the network,
wherein each synaptic element is adapted to receive a synaptic input signal and apply a weight to the synaptic input signal to generate a synaptic output signal, the synaptic elements being configurable to adjust the weight applied by each synaptic element,
wherein each of the spiking neurons is adapted to receive one or more of the synaptic output signals from one or more of the synaptic elements, and generate a spatio-temporal spike train output signal in response to the received one or more synaptic output signals, the method comprising:
bounding the weights of the synaptic elements by bound values, wherein the bound values are stochastic values;
wherein the weight of a synaptic element connected into a spiking neuron i is bounded by bounding the synaptic drive $\Gamma_i$ of the spiking neuron i in the spiking neural network, wherein the synaptic drive $\Gamma_i$ of one of the spiking neuron i is a time-dependent function describing a total transfer function of all synaptic elements that are connected into the neuron;
wherein the variance of each of the synaptic drives $\Gamma_i$ lies below a predetermined value such that the synaptic drive $\Gamma_i$ of each of the neuron i in the spiking neural network is bound around an equilibrium point $\Gamma^*_i$ of the synaptic drive $\Gamma_i$ where noise effects are minimal.

12. The method of claim 11, wherein the weights of the synaptic elements are configured using stochastic weight updates, wherein every synapse assembles the activation statistics of its input, the presynaptic neuron, if its output, the postsynaptic neuron, fires, wherein the activation statistics are collected at runtime from samples of an input distribution, and wherein the random variables used to set the stochastic weight updates in the spiking neural network are independent and identically distributed.

13. The method of claim 12, wherein the weights are updated according to a spike-event triggered stochastic online learning rule given by:

$$w_{ij}^{new}=w_{ij}+\eta_{ij}z_i(y_i e^{-w_{ij}}-1)$$

wherein $w_{ij}$ is the old weight of a synapse from input neuron i to output neuron j of the spiking neural network, $\eta_{ij}$ a local learning rate, $y_i$ the input of the presynaptic input neuron i, and $z_i$ output at the spiking times of neuron i.

14. The method of claim 11, wherein the variance is adjustable by obtaining an expression for the variance of each of the synaptic drives $\Gamma_i$, the expression for the variance depending on a control parameter, and wherein the variance of each of the synaptic drives $\Gamma_i$ is adjustable by adjusting the control parameter.

15. The method of claim 14, wherein the synaptic drive $\Gamma_i$ of the spiking neuron i in the spiking neural network can be written in vector form for all neurons in the spiking neural network as $\Gamma=(\Gamma_1,\ldots,\Gamma_n)^T$, wherein n is the number of neurons in the spiking neural network, and wherein $\Gamma$ satisfies the formula:

$$d\omega=N(\Gamma(t))dt+\sigma(\Gamma(t))d\omega(t),$$

where $N(\Gamma(t))$ is a nominal matrix part and $\sigma(\Gamma)$ is a state-dependent noise matrix for the Gaussian white noise process $d\omega(t)$, where $\omega$ is a Wiener process which describes noise in the spiking neural network,
wherein the expression for dr is rewritable in terms of the variance-covariance matrix K(t) of $\Gamma(t)$ satisfying the following continuous-time algebraic Lyapunov equation:

$$N(\Gamma(t))K(t)+K(t)[N(\Gamma(t))]^T+\sigma(\Gamma(t))[\sigma(\Gamma(t))]^T=0,$$

wherein the step of obtaining an expression for the variance of each of the synaptic drives $\Gamma_i$ comprises determining the diagonal values of the variance-covariance matrix K(t).

16. The method of claim 15, wherein the equilibrium point $\Gamma^*_i$ of the synaptic drive $\Gamma_i$ can be written in vector form for all neurons in the spiking neural network as $\Gamma^*=(\Gamma^*_1,\ldots,\Gamma^*_n)^T$, for which the noise matrix $\sigma$ is zero, i.e. $\sigma(\Gamma^*)=0$.

* * * * *